(12) United States Patent
Sun

(10) Patent No.: US 7,043,608 B2
(45) Date of Patent: May 9, 2006

(54) METHODS AND APPARATUS TO MANAGE A CACHE MEMORY

(75) Inventor: Mingqiu Sun, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 364 days.

(21) Appl. No.: 10/608,683

(22) Filed: Jun. 27, 2003

(65) Prior Publication Data
US 2004/0215668 A1  Oct. 28, 2004

Related U.S. Application Data

(63) Continuation-in-part of application No. 10/424,356, filed on Apr. 28, 2003.

(51) Int. Cl.
*G06F 12/00* (2006.01)

(52) U.S. Cl. ........................ 711/135; 711/137

(58) Field of Classification Search .............. None
See application file for complete search history.

(56) References Cited

U.S. PATENT DOCUMENTS

| | | | |
|---|---|---|---|
| 5,606,685 A * | 2/1997 | Frandeen ............. | 711/117 |
| 5,850,632 A * | 12/1998 | Robertson ........... | 711/170 |
| 6,237,065 B1 * | 5/2001 | Banerjia et al. ...... | 711/133 |
| 6,415,359 B1 * | 7/2002 | Kimura et al. ....... | 711/137 |
| 6,571,318 B1 * | 5/2003 | Sander et al. ........ | 711/137 |
| 6,622,168 B1 * | 9/2003 | Datta ................. | 709/219 |
| 6,751,707 B1 * | 6/2004 | Magoshi .............. | 711/133 |
| 6,752,335 B1 * | 6/2004 | Levia ................. | 239/587.3 |
| 2001/0042172 A1 * | 11/2001 | Duesterwald et al. .. | 711/125 |
| 2002/0152361 A1 * | 10/2002 | Dean et al. .......... | 711/160 |

OTHER PUBLICATIONS

Hazelwood, Kim et al., "Code Cache Management Schemes for Dynamic Optimizers," Proceedings of the Sixth Annual Workshop on Interaction between Compilers and Computer Architectures, IEEE, Feb. 3, 2002, pp. 92-100.*

Doug Joseph et al., *"Prefetching using Markov Predictors"*, 1997 Proceedings of the International Symposium on Computer Architecture (ISCA '97), Jun. 1997, Denver Colorado.

Ashutosh S. Dhodapkar et al., *"Managing Multi-Configuration Hardware via Dynamic Working Set Analysis"*, May, 2002.

Trishul M. Chilimbi et al., *" Dynamic Hot Data Stream Prefetching for General-Purpose Programs"*, PLDI-2002, May, 2002.

(Continued)

*Primary Examiner*—Matthew D. Anderson
*Assistant Examiner*—Michael Krofcheck
(74) *Attorney, Agent, or Firm*—Hanley, Flight & Zimmerman, LLC

(57) ABSTRACT

Methods and apparatus to manage a cache memory. An example method of managing a cache comprises identifying program states associated with an executing program; comparing a time of first discovery of a program state to a most recent time of first discovery to determine if the program state is associated with short-lived objects; and if the program state is associated with short-lived objects and program execution is transitioning to a program state associated with long-lived objects, flushing the cache of data associated with the program state.

46 Claims, 18 Drawing Sheets

OTHER PUBLICATIONS

Mingqiu Sun et al., "*Entropy-based Characterization of Program Phase Behaviors*", Feb. 2004, Madrid Spain.

S. Dhodapkar et al., "*Comparing Program Phase Detection Techniques*", Micro-2003, 2003.

V. Bala et al., "*Dynamo: A transparent dynamic optimization system*", PLDI '2000, Jun, 2000.

B. Balasubramonian et al., "*Memory Hierarchy Reconfiguration for Energy and Perfromance in General Purpose Architectures*", Micro-2000, Dec. 2000.

J. E. Smith et al., "*Dynamic Microarchitecture Adaptation via Co-designed Virtual Machines*", ISSCC-2002, Feb. 2002.

M. Huang et al., "*Positional Adaption of Processors: Application to Energy Reduction*", ISCA-2003, Jun. 2003.

T. Sherwood et al., "*Phase Tracking and Prediction*", ISCA-2003, Jun. 2003.

T. Sherwood et al., "*Automatically Characterizing Large Scale Program Behavior*", ASPLOS-2002, Oct. 2002.

C.E. Shannon, "*A Mathematical Theory of Communication*", Bell Syst. Tech. J., 27, 379-423, 623-656. Jul. and Oct., 1948.

*Standard Performance Evaluation Corperation* (SPEC) JBB2000 [online]. SPEC [retrieved on May 11, 2004]: Retrieved from the Internet: <URL: http://www.spec.org/jbb2000/>, 2 pages.

*Standard Performance Evaluation Corperation* (SPEC) JBB2000 [online]. SPECjAppServer [retrieved on May 14, 2004]: Retrieved from the Internet: <URL: http://www.spec.org/jAppServer2002/>, 2 pages.

*Dinero IV Trace-Driven Uniprocessor Cache Simulator*: [retrieved on May 14, 2004]: Retrieved from the Internet: <URL: http://www.cs.wisc.edu/~markhill/DineroIV/>, 2 pages.

\* cited by examiner

| STATE SIGNATURE: | | | 0101100101110 | | |
|---|---|---|---|---|---|
| AGE: | | | X | | |
| USAGE FREQUENCY: | | | Y | | |
| ENTROPY: | | | Z | | |
| STATE: | A | OCCURRENCE TIMES: | 00:00:00; 00:05:13 | PROBABILITY: | 0.63 |
| STATE: | C | OCCURRENCE TIMES: | 00:02:04; 00:09:42 | PROBABILITY: | 0.12 |
| STATE: | E | OCCURRENCE TIMES: | 00:00:13; 00:02:43 | PROBABILITY: | 0.08 |
| STATE: | G | OCCURRENCE TIMES: | 00:08:06; 00:09:18 | PROBABILITY: | 0.05 |
| STATE: | L | OCCURRENCE TIMES: | 00:10:03 | PROBABILITY: | 0.02 |
| STATE: | M | OCCURRENCE TIMES: | 00:07:53 | PROBABILITY: | 0.02 |
| . . . | . . . | . . . | . . . | . . . | . . . |
| . . . | . . . | . . . | . . . | . . . | . . . |
| . . . | . . . | . . . | . . . | . . . | . . . |
| STATE: | V | OCCURRENCE TIMES: | 00:13:31; 00:15:37 | PROBABILITY: | 0.01 |

FIG. 5

| STATE SIGNATURE: | | | 0101100101110 | | | |
|---|---|---|---|---|---|---|
| AGE: | | | X | | | |
| USAGE FREQUENCY: | | | Y | | | |
| ENTROPY: | | | Z | | | |
| STATE: | A | OCCURRENCE TIMES: | 00:00:00; 00:05:13 | PROBABILITY: | 0.63 | |
| STATE: | C | OCCURRENCE TIMES: | 00:02:04; 00:09:42 | PROBABILITY: | 0.12 | |
| STATE: | E | OCCURRENCE TIMES: | 00:00:13; 00:02:43 | PROBABILITY: | 0.08 | |
| STATE: | G | OCCURRENCE TIMES: | 00:08:06; 00:09:18 | PROBABILITY: | 0.05 | |
| STATE: | L | OCCURRENCE TIMES: | 00:10:03 | PROBABILITY: | 0.02 | |
| STATE: | M | OCCURRENCE TIMES: | 00:07:53 | PROBABILITY: | 0.02 | |
| ... | ... | ... | ... | ... | ... | |
| ... | ... | ... | ... | ... | ... | |
| ... | ... | ... | ... | ... | ... | |
| STATE: | V | OCCURRENCE TIMES: | 00:13:31; 00:15:37 | PROBABILITY: | 0.01 | |
| OBJECT REFERENCES: | | | A1 | A3 | A456 | A358 |
| A2 | A47 | A13256 | A5432 | A67834 | A89045 | A56732 | A45098 |
| A43 | A33 | A5623 | A1234 | A5432 | A5678 | A47890 | A87 |
| ... | ... | ... | ... | ... | ... | ... | ... |
| ... | ... | ... | ... | ... | ... | ... | ... |
| ... | ... | ... | ... | ... | ... | ... | ... |
| A764 | A368 | A412 | A8345 | A21 | A54 | A43876 | A11 |

FIG. 13

METHODS AND APPARATUS TO MANAGE A CACHE MEMORY

RELATED APPLICATION

This patent issued from a continuation-in-part of U.S. application Ser. No. 10/424,356, which was filed on Apr. 28, 2003.

FIELD OF THE DISCLOSURE

This disclosure relates generally to memory management, and, more particularly, to methods and apparatus to manage a cache memory.

BACKGROUND

Programs executed by computers and other processor based devices typically exhibit repetitive patterns. It has long been known that identifying such repetitive patterns provides an opportunity to optimize program execution. For example, software and firmware programmers have long taken advantage of small scale repetitive patterns through the use of iterative loops, etc. to reduce code size, control memory allocation and perform other tasks seeking to optimize and streamline program execution.

Recently, there has been increased interest in seeking to identify larger scale repetition patterns in complicated workloads such as, for example, managed run-time environments and other server-based applications, as a mechanism to optimize handling of those workloads. For instance, it is known that a workload may be conceptualized as a series of macroscopic transactions. As used herein, the terms macroscopic transaction and sub-transaction refer to a business level transaction and/or an application software level transaction. For instance, the workload of a server at an Internet retailer such as Amazon.com may be conceptualized as an on-going sequence of macroscopic transactions and sub-transactions such as product display, order entry, order processing, customer registration, payment processing, etc. Moving to a more microscopic level, each of the macroscopic transactions in the workload may be seen as a series of program states. It is desirable to optimize the execution of workloads by, for example, reducing the time it takes the hosting computer to transition between and/or execute macroscopic transactions and/or program states. Therefore, there is an interest in identifying repetition patterns of program states in macroscopic transactions in the hope of predicting program state transitions, optimizing the execution of macroscopic transactions and/or program states, and increasing the throughput of the workload associated with such transactions.

There have been attempts to exploit repetitive structures such as loops to, for example, prefetch data to a cache. However, those prior art methodologies have been largely limited to highly regular and simple workloads such as execution of scientific codes. Effectively predicting program states and/or macroscopic transactions for larger, more complicated workloads remains an open problem.

BRIEF DESCRIPTION OF THE DRAWINGS

FIG. 5 illustrates an example data structure which may be created for each identified state in the program.

FIG. 13 illustrates an example data structure which may be created for each identified state in the program.

DETAILED DESCRIPTION

As mentioned above, real world server applications typically exhibit repetitive behaviors. These repetitive behaviors are usually driven by local or remote clients requesting performance of tasks or business transactions defined by the application program interface (API) of the host site. Since the range of tasks available to the clients is limited, the client calls into the API manifest themselves as repetitive program execution patterns on the hosting server. As explained below, this type of repetitiveness provides efficiency opportunities which may be exploited through microprocessor architecture and/or software.

The basic unit of repetition within these repetitive program execution patterns is a macroscopic transaction or sub-transaction. A macroscopic transaction or sub-transaction may be thought of as one pathlength measured by instructions. The pathlength of such a transaction or sub-transaction is typically, for example, in the range of $10^4$ to $10^6$ instructions.

Each transaction or sub-transaction includes one or more program states. A program state is defined as a collection of information (e.g., a series of memory addresses and/or a series of instruction addresses) occurring in a given time window. A program state may be a measurement-dependent and tunable property. On the other hand, a transaction or a sub-transaction is typically an intrinsic property of a workload.

Figure 1:
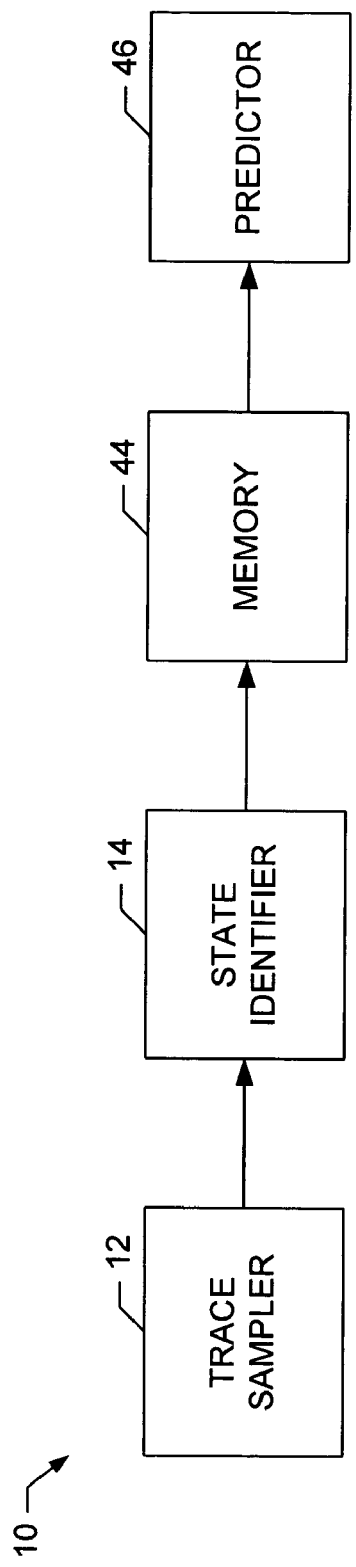
FIG. 1 is a schematic illustration of an example apparatus to detect patterns in programs.

FIG. 1 is a schematic illustration of an example apparatus 10 to predict program states of an executing program and/or to identify macroscopic transactions of the program. For the purpose of developing a trace of a program of interest, the apparatus 10 is provided with a trace sampler 12. The trace sampler 12 operates in a conventional fashion to develop any type of trace of the program of interest. For example, the trace sampler 12 may employ a hardware counter such as a processor counter and/or software instrumentation such as managed run-time environment (MRTE) instrumentation to gather trace data from the executing program. For instance, the trace sampler 12 may capture the instruction addresses appearing in the program counter of a processor to create an instruction address trace. By way of another example, the trace sampler 12 may snoop an address bus associated with the cache and/or main memory of a processor to create a memory address trace. Persons of ordinary skill in the art will readily appreciate that many other techniques can be used to create the same or different types of traces. For instance, the trace sampler 12 could alternatively be configured to create a basic block trace.

In order to identify a sequence of program states from the trace generated by the trace sampler 12, the apparatus 10 is further provided with a state identifier 14. As will be appreciated by persons of ordinary skill in the art, the state identifier 14 may identify the states within the trace created by (or being created by) the trace sampler 12 in any number of ways. In the illustrated example, the state identifier 14 identifies the program states by comparing adjacent sets of data at least partially indicative of entries appearing in the trace. To make this comparison more manageable, the illustrated state identifier 14 translates the sets into bit vectors which function as short hand proxies for the data in the sets. The illustrated state identifier 14 then compares the bit vectors of adjacent sets and determines if the difference between the bit vectors is sufficient to indicate that a new state has occurred. Each of the sets of data may comprise sequential groups of entries in the trace. Either all of the entries in the trace may be used, or a subset of the entries may be used (e.g., every tenth entry may be used) to create the sets. Further, either a fraction of the entries selected to be in the set (e.g., the last eight bits) or the entire portion of the entry (e.g., all of the bits in the entry) may be used to create the bit vectors. Persons of ordinary skill in the art will readily appreciate that adjusting the resolution of the sets (e.g., by adjusting the number of entries skipped in creating the sets and/or by adjusting the amount or location of the bits of the entries in the trace that are used to create the bit vectors), may adjust the identities of the program states that are identified by the state identifier 14. Thus, the program state definitions are measurement-dependent and tunable.

Figure 2:
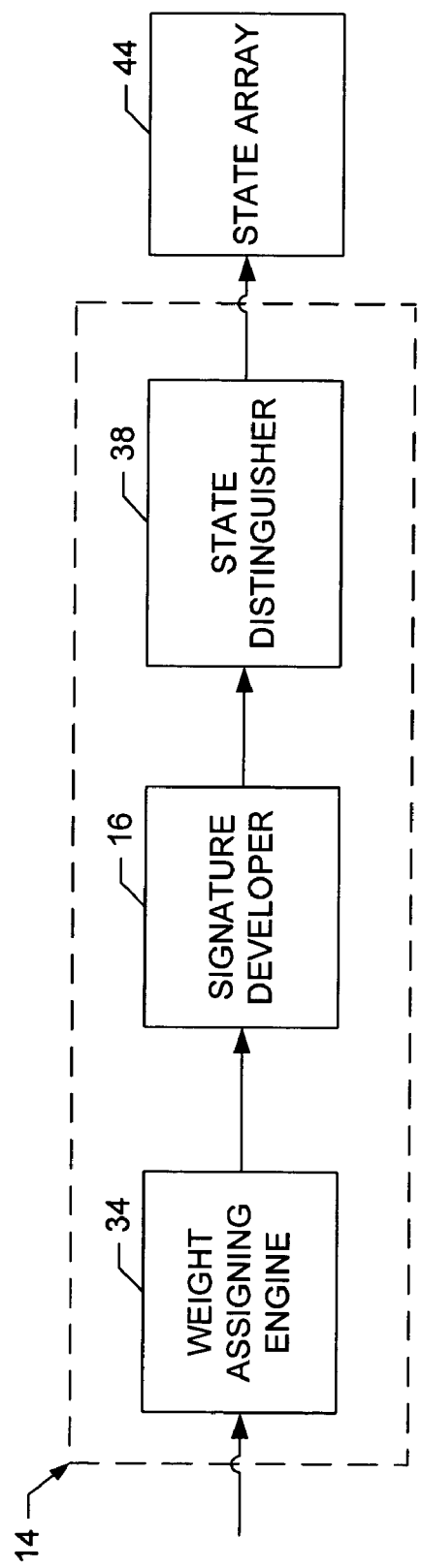
FIG. 2 is a more detailed schematic illustration of the example state identifier of FIG. 1.
Figure 3:
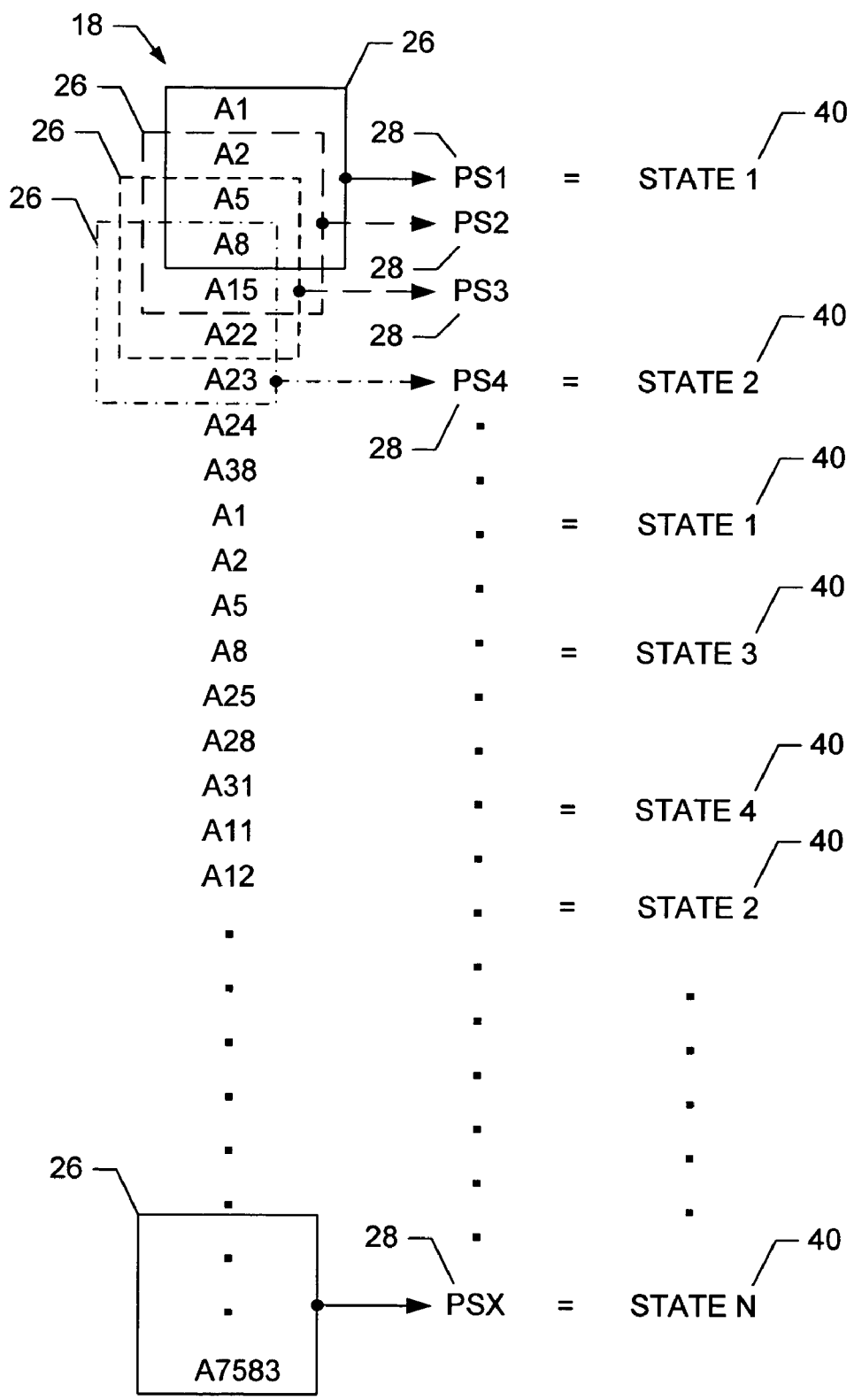
FIG. 3 is a schematic illustration of an example trace.

An example state identifier 14 is shown in FIG. 2. In the illustrated example, the state identifier 14 includes a signature developer 16 to develop possible state signatures from the sets of entries in the trace. To better illustrate the operation of the signature developer 16, consider the example trace shown in FIG. 3. In the example of FIG. 3, the trace 18 comprises a sequential series of entries representative in some fashion of a characteristic of the computer and/or a component thereof that changes over time as a result of executing the program of interest. For example, the entries may be instruction addresses appearing in the program counter of a processor, memory addresses appearing on an address bus of the cache or main memory associated with the processor, or any other recordable characteristic in the computer that changes as a result of executing the program. Persons of ordinary skill in the art will appreciate that the entries may be complete addresses, portions of complete addresses, and/or proxies for complete or partial addresses. In view of the broad range of possibilities for the types of data logged to create the entries of the trace 18, FIG. 3 generically describes these entries by the symbol "A" followed by a number. The number following the symbol "A" serves to uniquely distinguish the entries. To the extent execution of the program of interest causes the monitored characteristic used to create the trace to have the same value two or more times, the trace 18 will include the same entry two or more times (e.g., entry A5 appears twice in the trace 18). The number following the symbol "A" may indicate a relative position of the entry relative to the other entries. For example, if the trace 18 is an instruction address trace, each number following the letters may represent a location in memory of the corresponding address. For simplicity of explanation, unless otherwise noted, the following example will assume that the trace 18 is an instruction address trace reflecting the full memory addresses of the instructions executed by a processor running a program of interest.

The primary purpose of the signature developer 16 is to create proxies for the entries in the trace 18. In particular, the entries in the trace 18 may contain a significant amount of data. To convert these entries into a more manageable representation of the same, the signature developer 16 groups the entries into sets 26 and converts the sets 26 into possible state signatures 28. In the illustrated example, the possible state signatures 28 are bit vectors. The sets 26 may be converted into bit vectors 28 as shown in FIG. 4.

Figure 4:
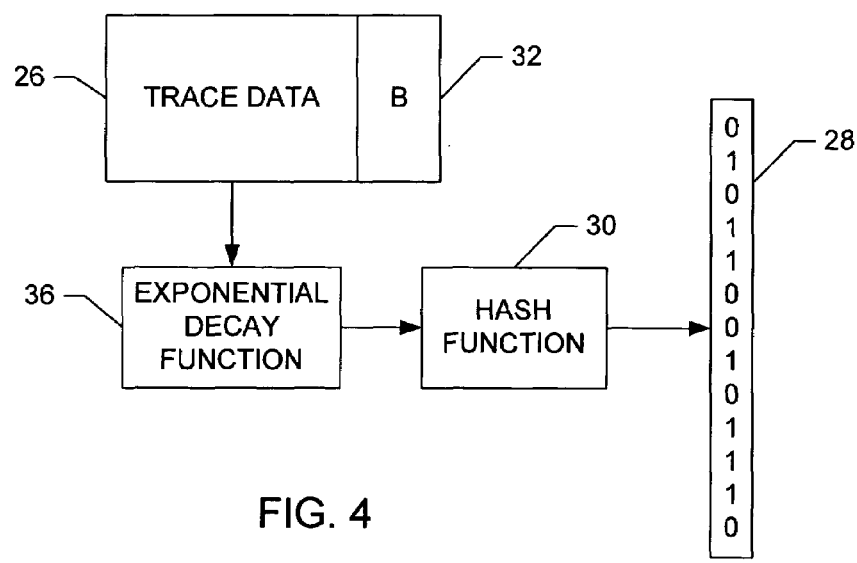
FIG. 4 is a diagram illustrating an example manner in which the signature developer and the weight assigning engine of FIG. 3 may operate to develop signatures.

In the example of FIG. 4 a random hashing function 30 is used to map the entries in a set 26 to an n-bit vector 28. In the example of FIG. 4, the value "B" 32 defines the resolution of the model (e.g., the number of entries in the set 26 that are skipped (if any) and/or processed by the hash function 30 to generate the n-bit vector 28). The basic use of a hash function 30 to map a set of entries from a trace 18 into a bit vector is well known to persons of ordinary skill in the art (see, for example, Dhodapkar & Smith, "Managing Multi-Configuration Hardware Via Dynamic Working Set Analysis," and thus, in the interest of brevity, will not be further explained here. The interested reader can refer to any number of sources, including, for example, the Dhodapkar & Smith article mentioned above, for further information on this topic.

For the purpose of weighting the members of the sets 26 such that later members have greater weight than earlier members of the set 26 when mapping the set 26 of entries to the bit vector signature 28, the apparatus 10 is further provided with a weight assigning engine 34. As shown in the example mapping function of FIG. 4, the weight assigning engine 34 applies an exponential decay function 36 (e.g., $f_i = e^{-t/T}$ where t=time and T=half lifetime) to the entries in a set 26 prior to operating on the set 26 with the hashing function 30. The exponential decay function 36 is applied to the entries in the set 26 of entries so that, when the hashing function 30 is used to convert the set 26 into a possible state signature 28, the latest entries in the set 26 have a greater impact on the values appearing in the possible state signature 28 than earlier values in the set 26. Persons of ordinary skill in the art will appreciate that, as with other structures and blocks discussed herein, the weight assigning engine 34 is optional. In other words, the exponential decay function 36 shown in FIG. 4 may be optionally eliminated.

As explained above, the illustrated signature developer 16 operates on sequential sets 26 of the entries appearing in the trace 18 to create a series of bit vectors 28 corresponding to those sets 26. Persons of ordinary skill in the art will readily appreciate that the signature developer 16 may group the entries in the trace 18 into sets 26 in any number of ways.

However, in the illustrated example, the signature developer 16 creates the sets 26 such that adjacent sets 26 overlap (i.e., share at least one entry). In other words, the signature developer 16 uses a sliding window to define a series of overlapping sets 26. The number of entries in the trace 18 that are shared by adjacent sets 26 (i.e., the intersection of adjacent sets) may be as small as one element or as large as all but one element (see, for example, the overlapping sets 26 in FIG. 4). In examples in which the signature developer 16 creates adjacent intersecting sets 26, it is particularly advantageous to also use the weight assigning engine 34 such that the possible state signatures 28 created by the signature developer 16 are more responsive to the newer non-overlapping entries than to the overlapping entries and the older non-overlapping entries.

In order to identify program states based on the possible state signatures 28, the apparatus 10 is further provided with a state distinguisher 38. In the illustrated example, the state distinguisher 38 begins identifying program states by selecting one of the possible state signatures 28 as a first state signature 40 (e.g., State 1 in FIG. 3) to provide a reference point for the remainder of the analysis. Typically, the first possible state signature 28 (e.g., PS1 in FIG. 3) in the sequence of possible state signatures (e.g., PS1-PSN) is, by default, selected as the first state signature 40, but persons of ordinary skill in the art will readily appreciate that this selection is arbitrary and another one of the possible state signatures 28 (e.g., PS2-PSN) may alternatively be used as the first state signature 40.

Once a first state signature 40 is selected, the state distinguisher 38 compares the first state signature 40 to a next subsequent one of the possible state signatures 28 (e.g., PS2). For example, if the first state signature 40 is the first possible state signature, the first state signature 40 may be compared to the second possible state signature PS2 in the list of possible state signatures 28. If the next subsequent state signature 28 (e.g., PS2) differs from the first state signature 40 by at least a predetermined amount, there has been sufficient change in the measured parameter used to create the trace 18 to designate the corresponding program as having entered a new program state. Accordingly, the state distinguisher 38 identifies the subsequent possible state signature 28 (e.g., PS2) as a second state signature.

If, on the other hand, the subsequent state signature 28 (e.g., PS2) does not differ from the first state signature 40 by at least a predetermined amount, there has not been sufficient change in the measured parameter used to create the trace 18 to designate the corresponding program as having entered a new program state. Accordingly, the state distinguisher 38 discards the possible state signature 28 (e.g., PS2), skips to the next possible state signature 28 (e.g., PS3), and repeats the process described above by comparing the first state signature 40 to the next possible state signature 28 (e.g., PS3). The state distinguisher 38 continues this process of sequentially comparing possible state signatures 28 (e.g., PS2-PSN) to the first state signature 40 until a possible state signature 28 (e.g., PS4) is identified that differs from the first state signature 40 by at least the predetermined amount. When such a possible state signature (e.g., PS4) is identified, the state distinguisher 38 designates that possible state signature (e.g., PS4) as the second state signature (e.g., State 2). All intervening possible state signatures 28 (e.g., PS2-PS3) are not used again, and, thus, may be discarded.

Once the second state (e.g., State 2) is identified, the state distinguisher 38 then begins the process of comparing the second state signature (e.g., PS4) to subsequent possible state signatures (e.g., PS5, etc.) to identify the third state (e.g., State 3) and so on until all of the possible state signatures (e.g., PS2-PSN) have been examined and, thus, all of the program states (State 1-State N) occurring during the current execution of the program have been identified. Example program states (i.e., State 2-State N) appearing after the first program state 40 are shown in FIG. 3. As shown in that example, any number of program states may occur and/or reoccur any number of times depending on the program being analyzed.

Persons of ordinary skill in the art will appreciate that there are many possible ways to compare the state signatures (e.g., State 1-State N) to subsequent possible state signatures (e.g., PS2-PSN) to determine if a new program state has been entered. Such persons will further appreciate that there are many different thresholds that may be used as the trigger for determining that a new state has been entered. The threshold chosen is a determining factor in the number and definitions of the states found in the program. In the illustrated example, the threshold difference required between signatures to declare a new program state is the Hamming distance. Thus, if the difference between a state signature (e.g., State 1) and a possible state signature (e.g., PS2) satisfies the following equation, then a new program state has been entered:

$$\Delta = |\text{State Signature } XOR \text{ Possible State Signature}| / |\text{State Signature } OR \text{ Possible State Signature}|$$

In other words, a new state has been entered in the example implementation if the set of bit values appearing in only one of: (a) the current state signature and (b) a possible state signature (i.e., the set of differences) divided by the set of all members appearing in either (a) the current state signature and/or (b) the possible state signature (i.e., the total set of members (e.g., logic one values appearing in the bit vectors)) is greater than a predetermined value (e.g., $\Delta$).

To manage data associated with the states identified by the state distinguisher 38, the apparatus 10 is further provided with a memory 44 (see FIG. 1). The memory 44 of the illustrated example is configured as a state array including a plurality of state data structures, wherein each data structure corresponds to a unique program state. As will be appreciated by persons of ordinary skill in the art, the state data structures and the state array 44 may be configured in any number of manners. In the illustrated example, the state array 44 is large enough to contain four hundred state data structures and each data structure in the state array includes the following fields: (a) the state signature of the corresponding program state, (b) an age of the corresponding program state, (c) a usage frequency of the corresponding program state, (d) an entropy value of the corresponding state, and (e) a sub-array containing a set of probabilities of transitioning from the corresponding program state to a set of program states.

An example state data structure is shown in FIG. 5. The state signature field may be used to store the bit vector signature (e.g., State 1-State N) of the state corresponding to the data structure. The age field may be used to store a value indicative of the time at which the corresponding state was last entered. The state array is finite, therefore the age field may be used as a vehicle to identify stale state data structures that may be overwritten to store data for a more recently occurring state data structure. The usage frequency field may be used to store data identifying the number of times the corresponding state has been entered during the lifetime of the data structure. The entropy value field may be used to store data that may be used to identify the end of a macroscopic transaction. The set of probabilities sub-array may be used to store data indicating the percentage of times program execution has entered program states from the program state corresponding to the state data structure during the lifetime of the state data structure. For example, each data structure may store up to sixteen sets of three fields containing data indicating a name of a program state to which the program state corresponding to the state data structure has transitioned in the past, the relative time(s) at which those transitions have occurred, and the percentage of times that the program state corresponding to the state data structure has transitioned to the state identified in the first field of the set of fields.

In order to determine entropy values associated with the program states identified by the state identifier, the apparatus 10 is further provided with a predictor 46. As explained below, in the illustrated example, the predictor 46 uses the entropy values to identify an end of a macroscopic transaction.

Figure 6:
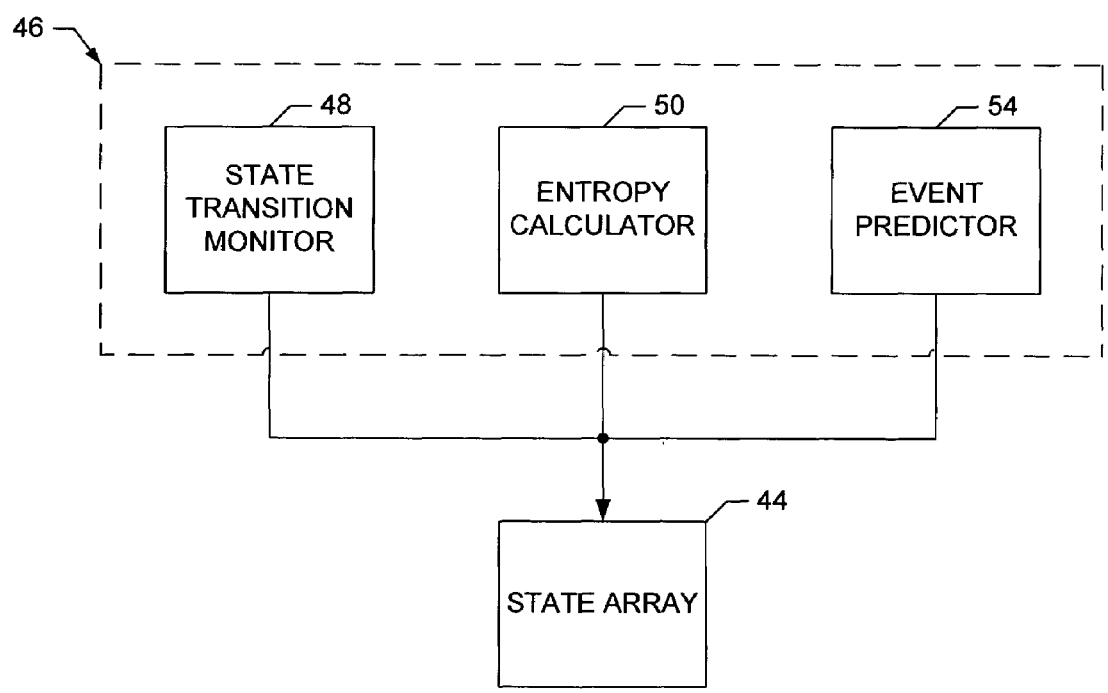
FIG. 6 is a more detailed schematic illustration of the example predictor of FIG. 1.

An example predictor 46 is shown in greater detail in FIG. 6. To calculate probabilities of transitioning from one of the program states to another of the program states, the predictor 46 is provided with a state transition monitor 48. Whenever a program state transition occurs (i.e., whenever the state of the program changes from one state to another), the state transition monitor 48 records the event in the sub-array of the state data structure corresponding to the program state that is being exited. In particular, the state transition monitor 48 records data indicating the name of the array transitioned to and the time (or a proxy for the time) at which the transition occurred. The time (or a proxy for the time) at which the transition occurred is recorded because, in the illustrated example, the state transition monitor 48 calculates the probabilities as exponential moving averages. Thus, instead of merely averaging the entries in the sub-array of the state data structure to calculate the probabilities of transitioning between specific states based on past performance, the state transition monitor 48 weights the entries in the sub-array of the state data structure based on their relative times of occurrence by multiplying those entries by an exponential function. As a result of this approach, entries in the sub-array which occur later in time have greater weight on the probability calculations than entries which occur earlier in time, and the state transition monitor 48 can, thus, identify changing patterns in the probabilities more quickly than an approach using straight moving averages.

To convert the probabilities calculated by the state transition monitor 48 into entropy values, the apparatus 10 is further provided with an entropy calculator 50. The entropy value of a given state is the transitional uncertainty associated with that state. In other words, given the past history of a current state, the entropy value quantifies the informational uncertainty as to which program state will occur when the current program state ends. For instance, for a given program state that has a past history of transitioning to a second program state and a third program state, the entropy calculator 50 converts the probabilities to entropy values for the given program state by calculating a sum of (1) a product of (a) a probability of transitioning from the subject program state to the second program state and (b) a logarithm of the probability of transitioning from the subject program state to the second program state, and (2) a product of (a) a probability of transitioning from the subject program state to the third program state and (b) a logarithm of the probability of transitioning from the subject program state to the third program state. Stated another way, for each state data structure in the state array 44, the entropy converter 50 calculates an entropy value in accordance with the well known Shannon formula:

$$H = -K \Sigma (Pi * \log Pi),$$

where H is the entropy value, K is a constant and Pi is the probability of transitioning from the current state (i.e., the state associated with the state data structure) to state "i" (i.e., the states identified in the sub-array of the data structure of the current state). The entropy value of each state identified in the executing program is stored in the data structure of the corresponding state (see FIG. 5).

In order to predict the next probable program state to be transitioned to from the current state, the predictor 46 further includes an event predictor 54. The event predictor 54 compares the probabilities appearing in the sub-array of the data structure of the current program state to determine the next most probable state or states. The next most probable state(s) are the state(s) that have the highest probability values.

The event predictor 54 also functions to identify a macroscopic transaction based on the entropy value associated with the current program state. Viewed from a macroscopic application logic level, one can observe a link to the calculated entropy value (H), which is a microscopic trace property. When a new transaction starts, program execution typically follows a relatively well-defined trajectory with low entropy. However, as program execution reaches the last program state in a macroscopic transaction, the entropy value spikes as there is maximum uncertainty about the possible next program state to which the program will transition. In other words, within a macroscopic transaction, there are typically repetitive sequences of program states. By observing past behavior between program states, one can detect these patterns and use them to predict future behavior. In contrast, the order of macroscopic transactions has a higher degree of randomness than the order of program states within a macroscopic transaction because the order in which macroscopic transactions are executed depends on the order in which requests for transactions are received from third parties and is, thus, substantially random. To make this point clearer, consider an on-line retailer. The server of the on-line retailer receives requests from a number of different customers and serializes those requests in a generally random fashion in a queue. The order in which the requests are handled is, thus, random. However, once the server begins serving a request, it will generally process the entire transaction before serving another transaction from the queue. As a result, the program state at the end of a macroscopic transaction typically has a high entropy value (i.e., there is a high level of uncertainty as to which program state will be entered), because there is a high level of uncertainty as to which macroscopic transaction will follow the current macroscopic transaction that just completed execution. Consequently, the last program state in a macroscopic transaction is characterized by a spike in its entropy value relative to the surrounding entropy values. In other words, the entropy value of the last program state of a macroscopic transaction is typically a relative maximum as compared to the entropy values of the program states immediately proceeding and following the last program state.

The event predictor 54 takes advantage of this characteristic by using this entropy spike as a demarcation mark for the end of a macroscopic transaction. A macroscopic transaction may thus be defined as an ordered sequence of program states with an entropy-spiking ending state. A macroscopic transaction maps to a business or application software transaction, which is an intrinsic property of a workload. The same macroscopic transaction may contain different sets of program states, which are measurement-dependent properties of a workload that can be tuned through the transition threshold value. One caution, however, is that repeatable sub-transactions that may not be significant to high level business logic may also end at a program state exhibiting a spiking entropy value and, thus, may be mis-identified as a macroscopic transaction. This mis-identification is not a problem in practical cases such as performance tuning of a program because sub-transactions with large transitional uncertainty behave like transactions for all practical purposes.

As stated above, the event predictor 54 identifies a spike in the entropy values of a series of program states as an end of a macroscopic transaction. Persons of ordinary skill in the art will appreciate that the event predictor 54 may use any number of techniques to identify a spike in the entropy values. For example, the event predictor 54 may compare the entropy value of the current state to the entropy value of the previous state and the entropy value of the following state. If the entropy value of the current state exceeds the entropy value of the previous state and the entropy value of the following state, the entropy value of the current state is a relative maximum (i.e., a spike) and the current state is identified as the end of a macroscopic transaction. Otherwise, it is not a relative maximum and the current state is not identified as the end of a macroscopic transaction.

Figure 7:
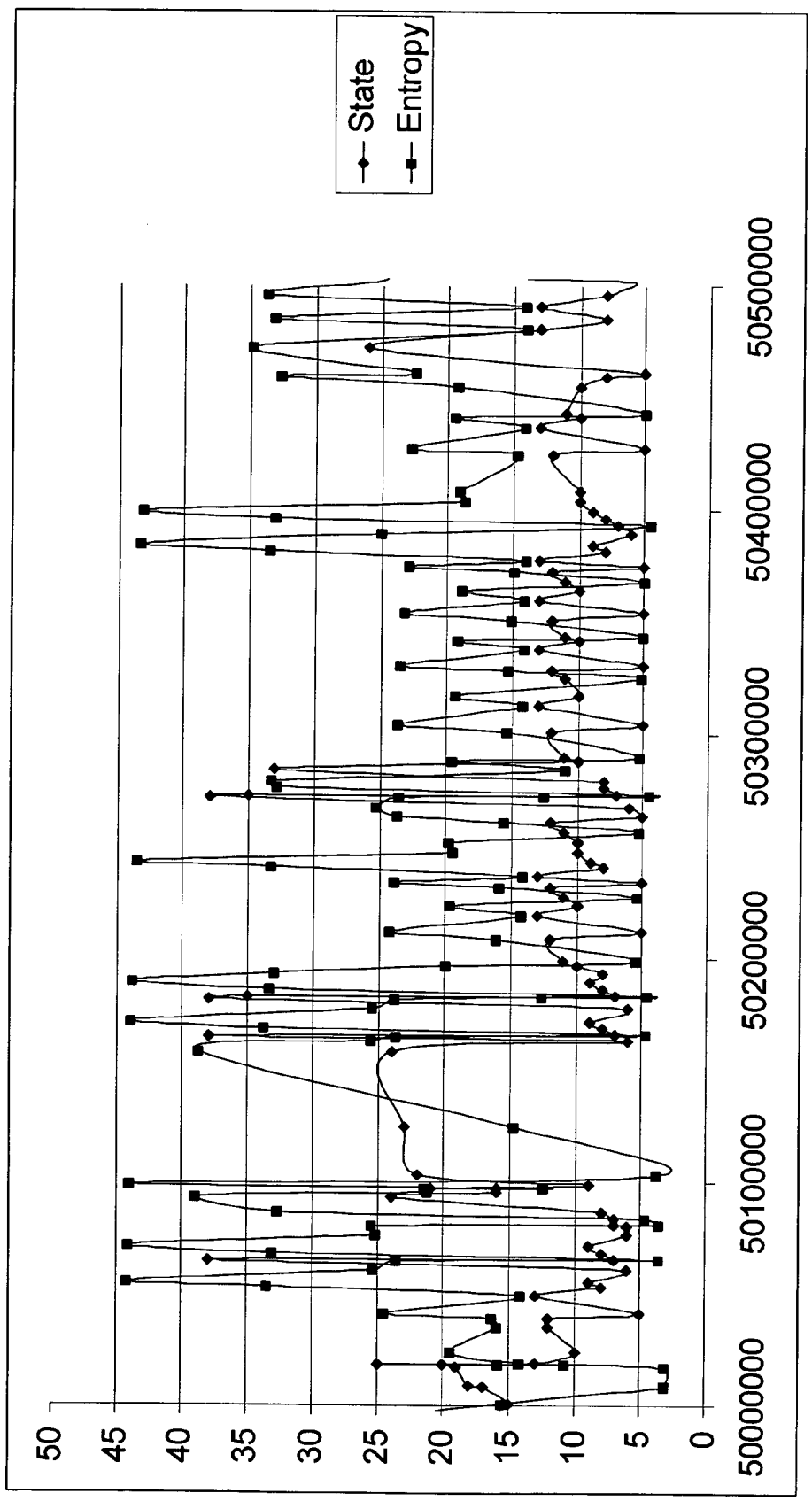
FIG. 7 is a chart graphing example entropy values calculated by the entropy calculator of FIG. 6.

A chart illustrating a graph of example entropy values calculated by the entropy calculator 50 is shown in FIG. 7. In the chart of FIG. 7, instead of using the signatures to index the program states, we use the first discovery time of each program state as its unique index. These first discovery times are used as the ordinates of the Y-axis in FIG. 7. (The ordinates of the Y-axis also represent entropy values as explained below.) Memory accesses are used as the ordinates of the X-axis of FIG. 7. The memory accesses are a proxy to time.

The chart of FIG. 7 includes two graphs. One of the graphs represents the program states that are entered over the time period at issue. The other graph represents the entropy values of the corresponding program states over that same time period. As can be seen by examining FIG. 7, each state in the graph (i.e., each data point represented by a diamond ♦) is positioned in vertical alignment with its corresponding entropy value (i.e., each data point represented by a square ■). As can also be seen in FIG. 7, the entropy values spike periodically. Each of these spikes in the entropy values represents an end of a macroscopic transaction.

Flowcharts representative of example machine readable instructions for implementing the apparatus 10 of FIG. 1 are shown in FIGS. 8 and 9A–9C. In this example, the machine readable instructions comprise a program for execution by a processor such as the processor 1012 shown in the example computer 1000 discussed below in connection with FIG. 10. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the trace sampler 12, the state identifier 14, the predictor 46, the weight assigning engine 34, the signature developer 16, the state distinguisher 38, the state transition monitor 48, the entropy calculator 50, and/or the event predictor 54 could be implemented by software, hardware, and/or firmware. Further, although the example program is described with reference to the flowcharts illustrated in FIGS. 8 and 9A–9C, persons of ordinary skill in the art will readily appreciate that many other methods of implementing the example apparatus 10 may alternatively be used. For example, the order of execution of the blocks may be changed, and/or some of the blocks described may be changed, eliminated, or combined.

Figure 8:
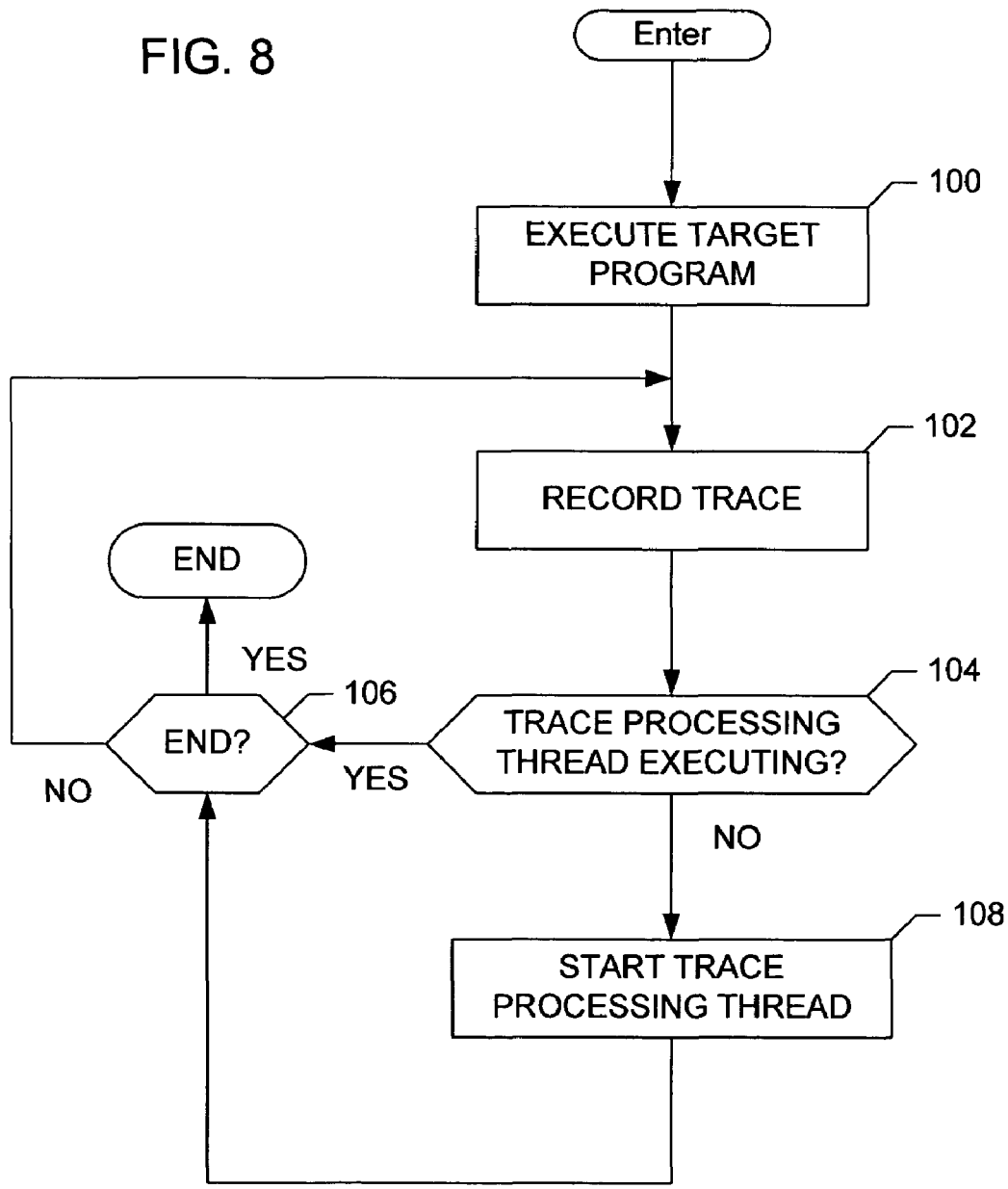
FIG. 8 is a flow chart illustrating example machine readable instructions for implementing the trace sampler of the apparatus of FIG. 1.

The program of FIG. 8 begins at block 100 where the target program begins execution. While the target program executes, the trace sampler 12 creates one or more traces 18 of one or more properties of the executing program (block 102). For example, the trace sampler 12 may generate an instruction address trace, a memory address trace, a basic block trace, and/or any other type of trace. Control proceeds from block 102 to block 104.

If a trace processing thread has already been invoked (block 104), control proceeds from block 104 to block 106. If the trace 18 of the program is complete (block 106), the program of FIG. 8 terminates. Otherwise, if the trace 18 of the program is not complete (block 106), control returns to block 102 where the recording of the trace 18 continues.

If the trace processing thread has not already been invoked (block 104), control proceeds to block 108. At block 108, the trace processing thread is initiated. Control then returns to block 106. As explained above, the program will terminate if the trace 18 is complete (block 106) or continue to generate the trace 18 (block 102) if the trace 18 has not yet been completed. Thus, control continues to loop through blocks 100–108 until the target program stops executing and the trace 18 is complete.

Figure 9A:
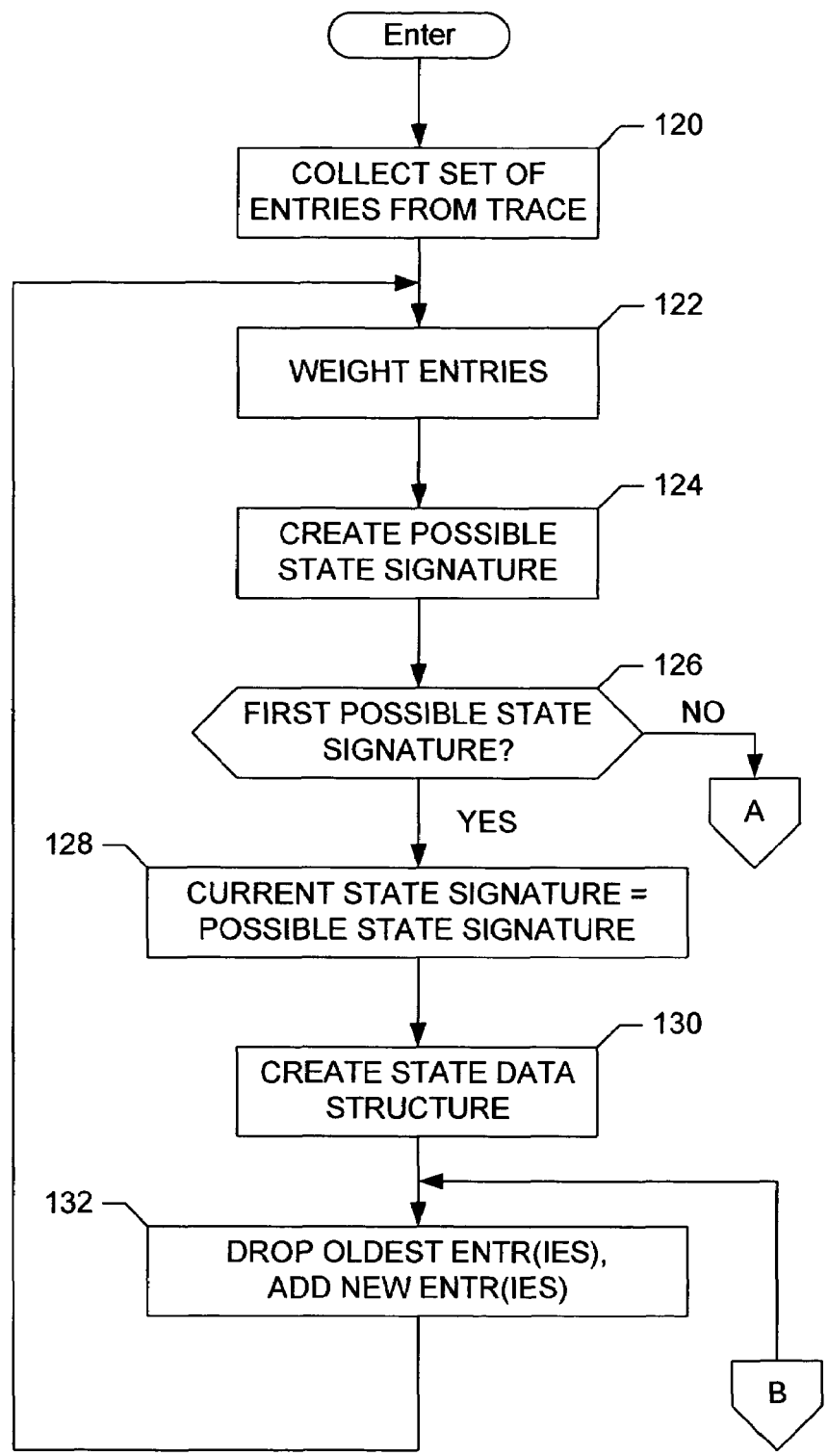
FIGS. 9A–9C are flowcharts illustrating example machine readable instructions for implementing the state identifier and predictor of the apparatus of FIG. 1.
Figure 9B:
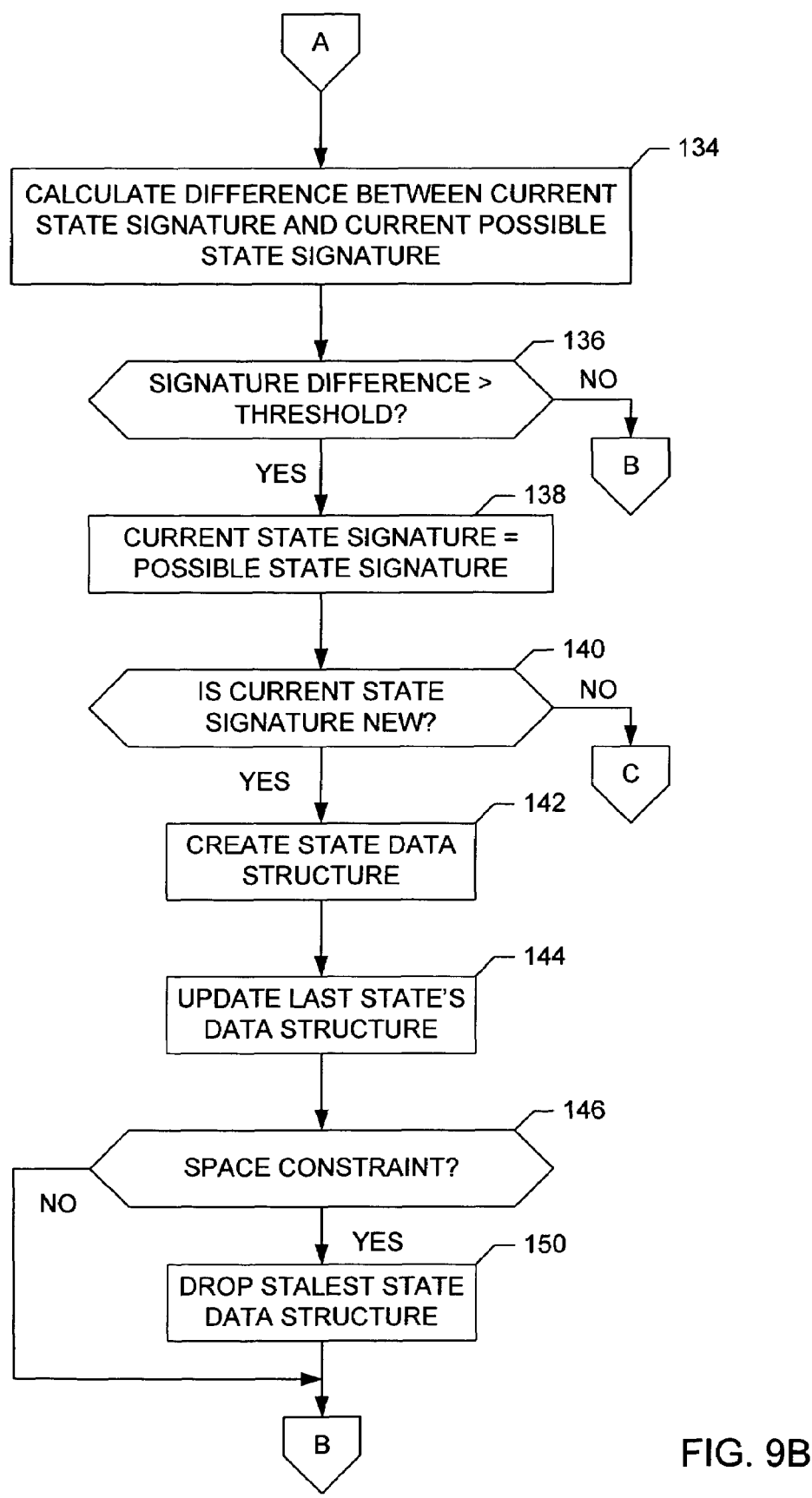
Figure 9C:
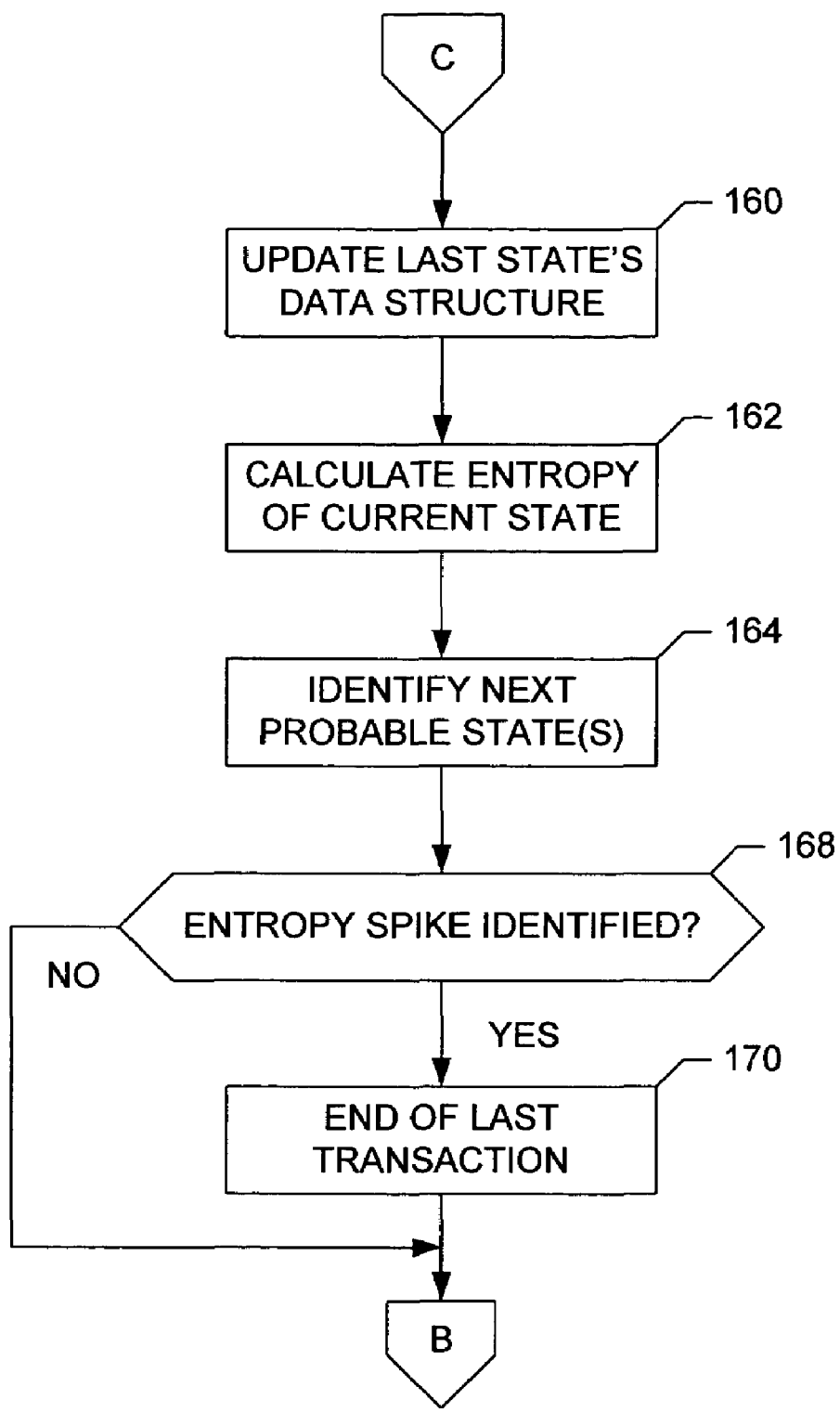

An example trace processing thread is shown in FIGS. 9A–9C. The illustrated trace processing thread begins at block 120 where the signature developer 16 obtains a set 26 of entries from the trace 18 created by the trace sampler 12. As explained above, the sets 26 of entries may be created in any number of ways to include any number of members. In the example of FIG. 3, each of the sets 26 include a series of sequential entries (i.e., no entries are skipped), and adjacent sets overlap (i.e., at least one of the entries is used in two adjacent sets. However, sets which skip some entries in the trace 18 and/or which do not overlap could alternatively be employed.

Once the entries to create a set 26 are retrieved from the trace 18 (block 120), the weight assigning engine 39 adjusts the values of the retrieved entries such that later entries are given greater weight than earlier entries (block 122). For example, the weight assigning engine 34 may apply an exponential decay function 36 (e.g., $f_1 = e^{-t/T}$) to the entries in the set (block 122).

Once the values of the entries have been weighted by the weight assigning engine 34 (block 122), the signature developer 16 maps the entries in the set 26 to an n-bit vector to create a possible state signature 28 for the set 26 (block 124). As explained above, the mapping of the entries in the set 26 to the possible state signature 28 may be performed using a hashing function.

After the possible state signature 28 is generated (block 124), the state distinguisher 38 determines whether the possible state signature 28 is the first possible state signature (block 126). If it is the first possible state signature (block 126), the first possible state signature is, by default, defined to be the first state signature. Thus, the state distinguisher 38 sets a current state signature variable equal to the possible state signature 28 (block 128) and creates a state data structure in the state array 44 for the first state (block 130). An example state data structure is shown in FIG. 5. The state distinguisher 38 may create the state data structure by creating the fields shown in FIG. 5, by writing the current state signature into the state signature field of the new state data structure, by setting the age field of the new state data structure equal to the current time or a proxy for the current time, and by setting the entropy field and the probability sub-array fields equal to zero.

The signature developer 16 then collects the next set 26 of entries for creation of a possible state signature 28 (block 132). In the illustrated example, the sets 26 used by the signature developer 16 to create the possible signatures 28 are overlapping. Thus, the signature developer 16 may create the next set 26 of entries by dropping the oldest entr(ies) from the last set 26 of entries and adding a like number of new entr(ies) to create a new current set 26 (block 132). Control then returns to block 122 where the entries in the new current set are weighted as explained above.

When at block 126, the current possible state signature is not the first possible state signature, control will skip from block 126 to block 134 (FIG. 9B). At block 134, the state distinguisher 38 calculates the difference between the current state signature (i.e., the value in the current state signature variable mentioned above), and the current possible state signature. The state distinguisher 38 then compares the computed difference to a threshold (e.g., the Hamming difference). If the computed difference exceeds the threshold (block 136), a program state change has occurred and control proceeds to block 138. If the computed difference does not exceed the threshold (block 136), the signature developer 16 collects the next set 26 of entries for creation of a possible state signature 28 (block 132, FIG. 9A) and control returns to block 122 as explained above. Thus, control continues to loop through blocks 122–136 until a program state change occurs.

Assuming for purposes of discussion that a program state change has occurred (block 136), the state distinguisher 38 sets the current state signature variable equal to the current possible state signature 28 (block 138). The state distinguisher 38 then examines the signatures present in the state array 44 to determine if the current state signature corresponds to the signature of a known state (block 140). If the current state signature is a known state signature, control advances to block 160 (FIG. 9C). Otherwise, if the current state signature is not a known state signature (i.e., the current state signature does not correspond to a state already existing in the state array 44), control advances to block 142 (FIG. 9B).

Assuming for purposes of discussion that the current state signature is not a known state signature (e.g., the current program state is a new program state) (block 140), the state distinguisher 38 creates a state data structure in the state array 44 for the first state (block 142) as explained above in connection with block 130.

The state transition monitor 48 then updates the last state's probability sub-array to reflect the transition from the last state to the new current state (block 144). Control then proceeds to block 146 where the state distinguisher 38 determines if the state array 44 has become full (i.e., if the newly added data structure used the last available spot in the state array). If the state array 44 is not full, control returns to block 132 (FIG. 9A) where the signature developer 16 collects the next set 26 of entries for creation of a possible state signature 28. Control then returns to block 122 as explained above.

If the state array is full (block 146), control advances to block 150 (FIG. 9B) where the state distinguisher 38 deletes the stalest state data structure from the state array 44. The stalest state data structure may be identified by comparing the usage fields of the state data structures appearing in the state array 44. Once the stalest state data structure is eliminated (block 150), control advances to block 132 where the signature developer 16 collects the next set 26 of entries for creation of a possible state signature 28. Control then returns to block 122 as explained above.

Assuming that the current state signature is a known state signature (block 140), control proceeds to block 160 (FIG. 9C). The state transition monitor 48 then updates the last state's probability sub-array to reflect the transition from the last state to the new current state (block 160). Control then proceeds to block 162 where the entropy calculator 50 calculates the entropy value of the current state. As explained above, the entropy value may be calculated in many different ways. For instance, in the illustrated example, the entropy value is calculated using the Shannon formula.

Once the entropy value is calculated (block 162), the event predictor 54 identifies the next most probable state(s) (block 164) by, for example, comparing the values in the probability sub-array of the state data structure of the current state. The event predictor 54 may then examine the entropy values of the last few states to determine if an entropy spike has occurred (block 168). If an entropy spike is identified (block 168), the event predictor 54 identifies the program state corresponding to the entropy spike as the last state of a macroscopic transaction or sub-transaction (block 170). If an entropy spike is not identified (block 168), the end of a macroscopic transaction or sub-transaction has not occurred. Accordingly, control skips block 170 and returns to block 132 (FIG. 9A).

Irrespective of whether control reaches block 132 via block 170 or directly from block 168, at block 132 the signature developer 16 collects the next set 26 of entries for creation of a possible state signature 28. Control then returns to block 122 as explained above. Control continues to loop through blocks 122–170 until the entire trace 18 has been processed. Once the entire trace 18 has been processed, the trace processing thread of FIGS. 9A–9C terminates.

Persons of ordinary skill in the art will readily appreciate that the above described program state identification framework may be employed (in some cases, with modifications) to achieve various performance enhancements. For example, the above described framework may be modified to detect memory access patterns and to leverage those patterns to achieve more efficient memory usage. To further elucidate this point, an example apparatus 300 to manage a cache memory to reduce cache misses is shown in FIG. 10.

Figure 10:
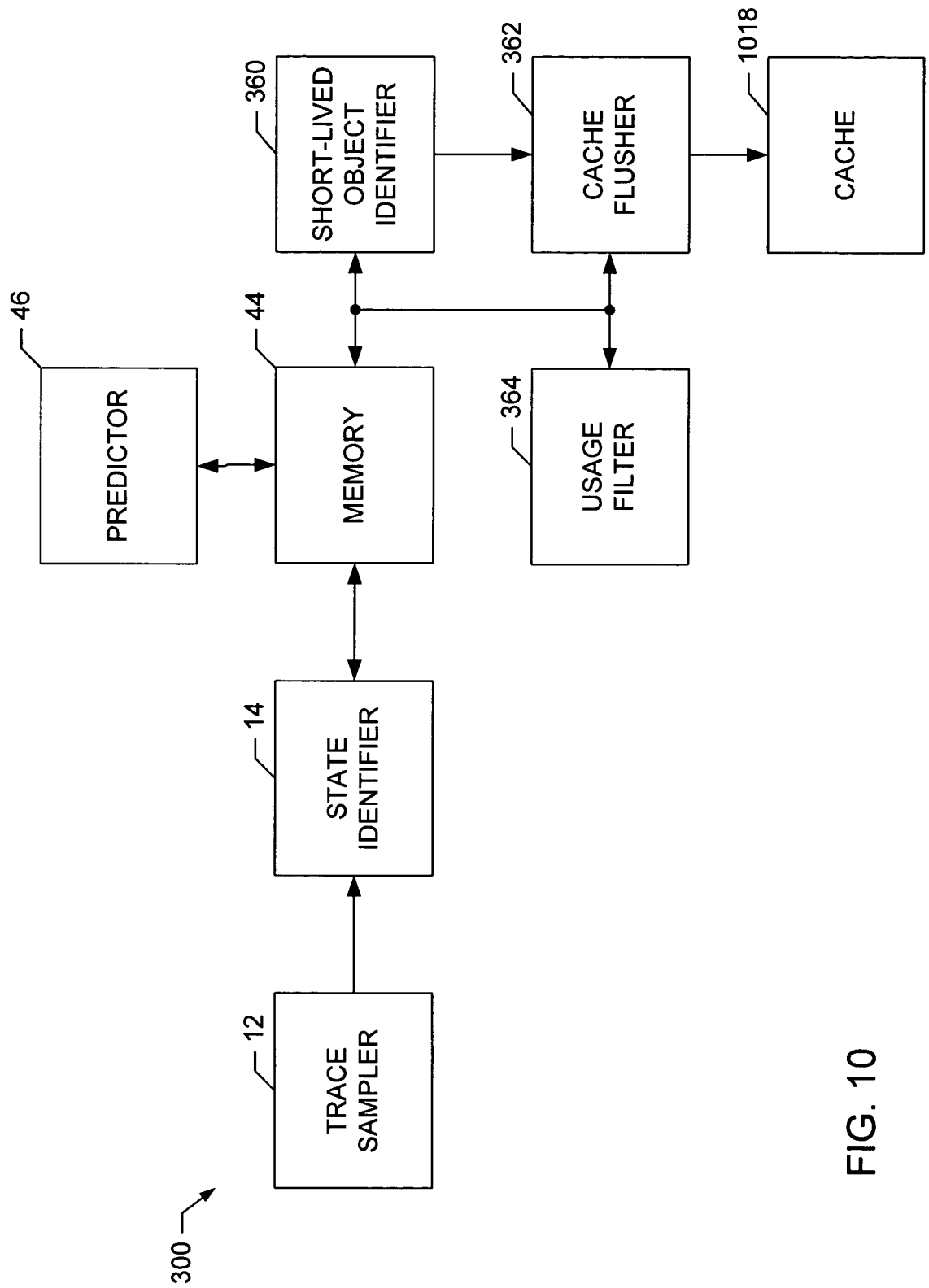
FIG. 10 is a schematic illustration of an example apparatus to manage a cache memory.

The example apparatus 300 of FIG. 10 utilizes some of the same structures as the apparatus 10 of FIG. 1. Indeed, the illustrated apparatus 300 incorporates all of the structures of the apparatus of FIG. 1 (as shown in FIG. 10 by the structures bearing the same names and reference numbers as the corresponding structures in FIG. 1), and adds other structures to perform additional functionality. However, persons of ordinary skill in the art will appreciate that, if desired, structures appearing in the example apparatus 10 may be eliminated from the example apparatus 300 of FIG. 10. For example, if state prediction is not desired, the predictor 46 and/or parts thereof may optionally be eliminated from the apparatus 300.

Since there is overlap between the structures and functionality of the example apparatus 10 and the example apparatus 300, in the interest of brevity, descriptions of the overlapping structures and functions will not be repeated here. Instead, the interested reader is referred to the corresponding description of the example apparatus 10 of FIG. 1 for a description of the similar structures appearing in the example apparatus 300 of FIG. 10. To facilitate this process, like structures are labeled with the same names and reference numerals in the figures and descriptions of the apparatus 10 and the apparatus 300.

Like the example apparatus 10, the example apparatus 300 includes a trace sampler 12 to develop a trace of a program of interest, and a program state identifier 14 to identify program states from the trace. It also includes a memory 44 to store data structures containing data representative of the states identified by the program state identifier 14. As mentioned above, the illustrated apparatus 300 also includes a predictor 46 to predict the next program state to be entered by the executing program and/or to identify the ends of macroscopic transactions.

In the illustrated example, rather than using instruction addresses to create an instruction trace, the trace sampler 12 of the apparatus 300 records the memory addresses (or a proxy for the memory address) that are issued to retrieve data and/or instructions from the main memory and/or a mass storage device to the cache to create a main memory address trace. Thus, the program states identified by the state identifier 14 of the example apparatus 300 are based on a memory address trace and, consequently, are reflective of patterns in memory accesses, as opposed to patterns in instruction execution as would be the case if the program states were created based on an instruction address trace.

Managed run time environment (MRTE) and other applications such as network processing and streaming media applications often create many memory objects during execution. As used herein, the term "memory object" refers to an instruction, part of an instruction, and/or data that is stored in at least one of a main memory, a cache memory, and a mass storage medium (i.e., a compact disk, a digital versatile disk, a hard disk drive, a flash memory, etc). Creation of a memory object may involve retrieving a copy of the object from the main memory or mass storage medium and storing one or more copies of the object in one or more levels of the cache, and/or initializing one or more locations in the cache and/or main memory for storage of data and/or instructions. As used herein, the term "memory reference" refers to an address (or a proxy for an address) used to retrieve a memory object from a main memory and/or a mass storage device to the cache memory, and/or an address (or a proxy for an address) used to retrieve a memory object from a mass storage device to the main memory and/or the cache memory.

The memory objects stored in the cache and/or main memory have different lifecycle characteristics due to their intrinsic functional differences. For example, some memory objects are used and reused with high frequency over a long time interval, while other memory objects are used and/or reused intensively for a short period of time immediately following their creation and then discarded or reused infrequently. Because objects that are frequently used and reused over a long time interval tend to be important to overall program functionality, objects that are frequently used and reused over the course of program execution tend to be needed relatively early in program execution and, thus, the program states reflective of those frequently used objects are first created relatively early in program execution. On the other hand, objects that are intensively used and reused for a short time period and then discarded or reused only infrequently tend not to be needed until later in program execution and, thus, the program states reflective of those infrequently used memory objects tend to be first created later in program execution. Based on these tendencies, as used herein, the terms "long-lived memory object" and "high frequency memory object" refer to a memory object that is repetitively used over a long time period with a relatively high frequency and the terms "short-lived memory object" and "low frequency memory object" refer to a memory object that may be used and reused intensively for a short time interval after its creation, but is then either discarded or, reused at a relative low frequency. Thus, long-lived memory objects are usually created early in the execution of a program, while short-lived memory objects tend to be created later in the execution of a program.

Figure 11:
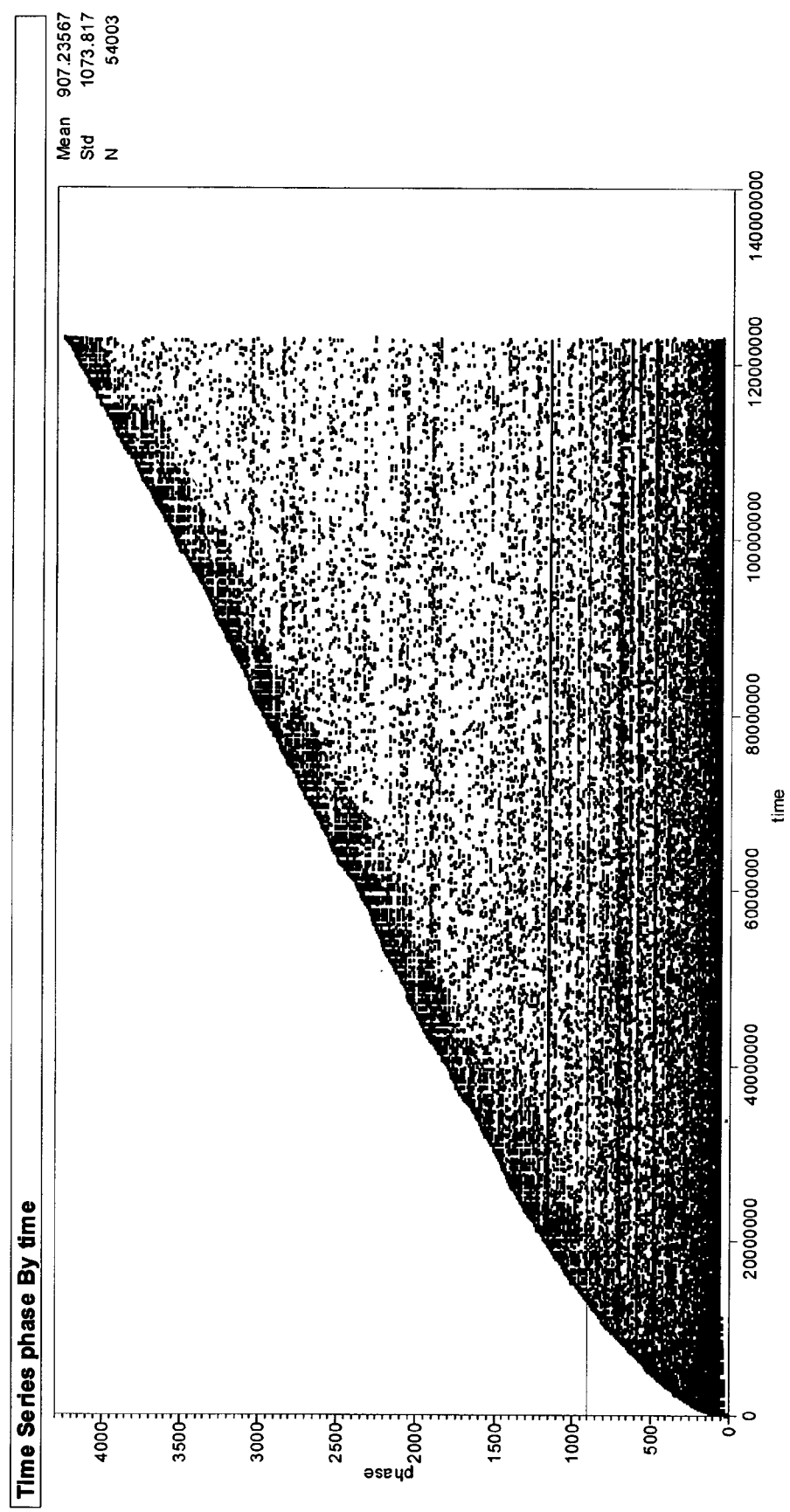
FIG. 11 is a chart graphing example times of first discovery of example program states in an example managed run-time environment workload as a function of time.

The example memory address program state diagram of FIG. 11 illustrates this proposition. In the example diagram of FIG. 11, the y-axis corresponds to program states and the x-axis corresponds to memory accesses, which is a proxy for time. In the illustrated chart, each program state is denoted by its time of first discovery (i.e., the time that the corresponding program state was first identified by the state identifier 14). Thus, points appearing on the same horizontal line across the diagram reflect occurrences and reoccurrences of the same program state. The more points that appear on a given horizontal line (i.e., the more "solid" a given horizontal line appears), the more frequently the corresponding program state occurs. Since, in this example, program states are defined based on a memory trace, a reoccurrence of a program state reflects a reoccurrence of generally the same set of memory objects being retrieved to the memory being monitored (e.g., the cache). In other words, the repeated occurrence of a given program state in FIG. 11 indicates a repeated creation of the memory objects corresponding to that program state in the memory being monitored.

As stated above, the y-values are representative of the times of first discovery of the corresponding program states. Examining FIG. 11, one can see that program states which occur earlier in program execution (i.e., program states with earlier times of first discovery and, thus, lower y-axis values) tend to occur with higher frequency than program states that are first created later in time. In particular, in reviewing FIG. 11, one can see that, in general, the horizontal lines corresponding to program states tend to become less solid (i.e., more broken) as one moves up the y-axis. In other words, earlier created program states tend to occur more frequently and, thus, tend to correspond to frequently used memory objects. Stated another way, the heavy concentration of program states near the bottom of the diagram of FIG. 11 reflects long-lived objects (i.e., objects that are frequently used), while the concentrated strip near the slope of the diagram reflects short-lived objects (i.e., objects that are infrequently used). (Persons of ordinary skill in the art will appreciate that the concentrated strip near the slope of the diagram occurs because even short-lived objects tend to be used and reused frequently for short periods of time following their time of first creation.)

In view of the foregoing, the y-axis value of a given program state relative to the current peak value of the y-axis (i.e., the point on the slope of the diagram) is an indication of the type of objects corresponding to that program state. In particular, a lower ratio between the y-axis value of a given program state (i.e., the time of first discovery of the given program state) and the highest value recorded relative to the y-axis (i.e., the most recent time of discovery of a program state), indicates a higher probability that the given program state corresponds to long-lived objects. Conversely, a higher ratio between the y-axis value of a given program state (i.e., the time of first discovery of the given program state) and the highest value recorded relative to the y-axis (i.e., the time of first discovery of the most recently discovered program state), indicates a lower probability that the given program state corresponds to long-lived objects.

Figure 12:
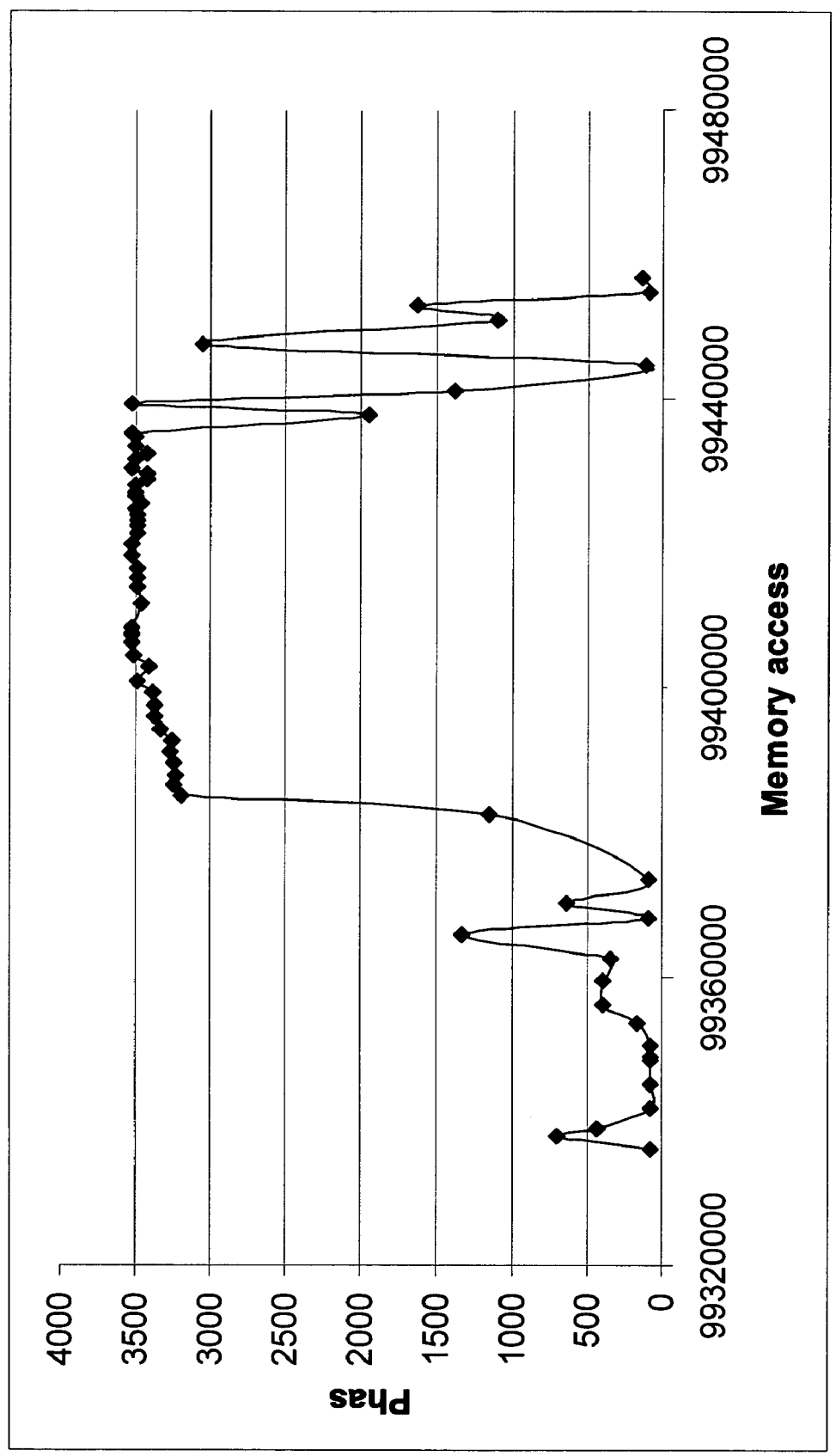
FIG. 12 is a chart similar to the chart of FIG. 1, but with the resolution of the x-axis greatly increased.

A generally vertical slice of the diagram of FIG. 11 shows that program states corresponding to short-lived objects tend to be clustered together (i.e., see the heavy concentration of program states near the slope of the diagram) and that program states corresponding to long-lived objects also tend to occur in clusters. This observation has been verified through empirical examination of memory state diagrams of many different MRTE workloads. This clustering can also be seen by expanding the resolution of the x-axis of the diagram of FIG. 11 as shown in FIG. 12.

The clustering of program states corresponding to short-lived objects means that the cache tends to become polluted with a large number of short-lived objects corresponding to the clustered program states. This cache pollution results in cache misses when the more frequently used, long-lived objects are required (e.g., at the end of a cluster of short-lived program states). Since there is a constant stream of transitions between clusters of program states corresponding to short-lived objects and program states corresponding to long-lived objects in many workloads such as MRTE server applications, as a practical matter increasing the size of the cache does not solve the problem, it merely delays the occurrence of the cache miss problem as the cache will eventually become filled by short-lived objects. The apparatus 300 of FIG. 10 attempts to address this cache pollution problem by detecting transitions between clusters of program states associated with short-lived objects and program states associated with long-lived memory objects, and by flushing the cache of short-lived objects when the beginning of such a transition is detected.

For the purpose of identifying program states that are associated with short lived memory objects, and for identifying transitions between clusters of program states associated with short-lived objects and program states associated with long-lived objects, the apparatus 300 is further provided with a short-lived object identifier 360. The short-lived object identifier 360 identifies program states associated with short-lived memory objects based on the times of first discovery of the program states. In the illustrated example, the short-lived object identifier 360 identifies a given program state as being associated with a short-lived object by comparing a time of first discovery of the given program state to the most recent time of first discovery (i.e., the time of first discovery of the newest (i.e., most recently identified) program state). More specifically, the short-lived object identifier 360 identifies a program state as being associated with short-lived objects if (a) the time of first discovery of the given program state is less than a predetermined percentage (e.g., 90%) of the most recent time of first discovery.

The short-lived object identifier 360 of the illustrated example identifies transitions between a program state associated with short-lived objects and a program state associated with long-lived objects by identifying a given program state as being associated with short-lived objects, and then comparing a time of first discovery of a previous program state proceeding the given program state (e.g., the program state that occurred immediately before the given program state identified as being associated with short-lived objects such that no program state occurs between the given program state and the previous program state) to the most recent time of first discovery. More specifically, in the illustrated example, the short-lived object identifier 360 identifies a transition between a given program state associated with short-lived objects and a program state associated with long-lived objects if (a) the time of first discovery of the given program state is less than a first predetermined percentage (e.g., 90%) of the most recent time of first discovery, and (b) the time of first discovery of the program state proceeding the given program state is greater than a second predetermined percentage (e.g., 90%) of the most recent time of first discovery. The first and second predetermined percentages may be equal or different, and may be referred to as "a state cross-over threshold."

In order to remove short-lived memory objects from the memory being managed (e.g., the cache), the example apparatus 300 of FIG. 10 is further provided with a cache flusher 362. The cache flusher 362 of FIG. 10 is responsive to a determination by the short-lived object identifier 360 that the program is transitioning or has transitioned from a program state associated with short-lived objects to a program state associated with long-lived objects to flush the memory being managed (e.g., the cache) of at least some of the short-lived objects. The cache flusher 362 may remove short-lived memory objects from the memory by, for example, releasing the memory location(s) associated with the short-lived objects to be removed for overwriting. In the illustrated example, the cache flusher 362 removes the short-lived objects from the cache by releasing the short-lived objects for overwriting as mentioned above and then pre-fetching memory object(s) associated with program state(s) having a time of first discovery which is less than a third threshold. The third threshold, which may or may not be equal to one or both of the first and second thresholds mentioned above, may be, for example a predetermined percentage (e.g., 90%) of the most recent time of first discovery. Pre-fetching memory object(s) of program state(s) associated with long-lived objects reduces cache misses by pre-loading the cache with objects that are likely to be used by the program when executing program states associated with long-lived objects.

To enhance the efficiency of the pre-fetching process, the illustrated apparatus 300 is further provided with a usage filter 364. The usage filter 364 limits the memory objects pre-fetched by the cache flusher 362 to memory objects meeting one or more usage criterion. The usage criterion may be any criterion that attempts to limit the pre-fetches to objects that are expected to be used. For example, the usage criterion may be based on frequency of use, length of time since last use, and/or on a prediction of the next program state(s) made, for instance, by the predictor 46 as explained above. Other usage filter criteria will be apparent to persons of ordinary skill in the art and may be substituted for, or added to, any or all of the usage filter criteria listed above.

To make it possible to pre-fetch memory objects, the apparatus 300 records a list of memory references for each program state. For example, the example data structure discussed above in connection with FIG. 5 may be modified as shown in FIG. 13 to include the memory object references (or proxies for the memory object references which may be reconstructed to form the memory object references) employed to retrieve the memory objects associated with the corresponding program state. As noted above, the memory object references may be memory addresses. Thus, the object references appended to the example data structure of FIG. 13 may comprise the portion of the memory address trace (or a reference (e.g., a link) to the portion of the memory address trace) corresponding to the subject program state.

From the foregoing, persons of ordinary skill in the art will appreciate that the example apparatus 300 described above utilizes a state age cross-over criteria to solve the cache pollution problem caused by the constant creation and destruction of short-lived objects which occurs in many MRTE and other applications. The state age cross-over criteria can be mathematically described by the following equation:

If current_state.age<$A_{th}$*peak_age and
previous_state.age>$A_{th}$*peak_age, then issue_
memory_profile_prefetch($A_{th}$), wherein the first discovery time of each program state is its age, the peak_age is the discovery time of the latest new state, $A_{th}$ is a threshold value, and the memory_profile_prefetch operation prefetches memory objects associated with program states whose age is smaller than the value of $A_{th}$*peak_age. As noted above, a usage filter or other filtering criteria may be used to reduce the cost (number of additional memory operations) associated with the prefetching operation.

Flowcharts representative of example machine readable instructions for implementing the apparatus 300 of FIG. 10 are shown in FIGS. 8, 14A–14C, and 15. In this example, the machine readable instructions comprise a program for execution by a processor such as the processor 1012 shown in the example computer 1000 discussed below in connection with FIG. 16. The program may be embodied in software stored on a tangible medium such as a CD-ROM, a floppy disk, a hard drive, a digital versatile disk (DVD), or a memory associated with the processor 1012, but persons of ordinary skill in the art will readily appreciate that the entire program and/or parts thereof could alternatively be executed by a device other than the processor 1012 and/or embodied in firmware or dedicated hardware in a well known manner. For example, any or all of the trace sampler 12, the state identifier 14, the predictor 46, the short-lived object identifier 360, the cache flusher 362 and the usage filter 364 could be implemented by software, hardware, and/or firmware. Further, although the example program is described with reference to the flowcharts illustrated in FIGS. 8, 14A–14C and 15, persons of ordinary skill in the art will readily appreciate that many other methods of implementing the example apparatus 300 may alternatively be used. For example, the order of execution of the blocks may be changed, and/or some of the blocks described may be changed, eliminated, or combined.

Since, as explained above, some of the structures of the example apparatus 10 are substantially identical to structures of the example apparatus 300, if those overlapping structures are implemented via software and/or firmware, they may be implemented by similar programs. Thus, for example, the trace sampler 12, the state identifier 14 and the predictor 46 may be implemented in the example apparatus 300 using substantially the same machine readable instructions described above in connection with FIGS. 8 and 9A–9C. In the interest of brevity, the blocks of the program used to implement the apparatus 300 which are the same or substantially the same as the blocks of the program used to implement the apparatus 10, will be described in abbreviated form here. The interested reader is referred to the above description for a full description of those blocks. To facilitate this process, like blocks are labeled with like reference numerals in FIGS. 9A–9C and 14A–14C.

As mentioned above, the trace sampler 12 is implemented by substantially the same machine readable instructions in the apparatus 300 as in the apparatus 10. Thus, the above-description of blocks 100–108 applies to both the example apparatus 10 and the apparatus 300, except that in the apparatus 300, the trace sampler 12 generates a memory address trace. The program of FIG. 8 begins at block 100 where the target program begins execution. While the target program executes, the trace sampler 12 creates a memory address trace (block 102). Control proceeds from block 102 to block 104.

If a trace processing thread has already been invoked (block 104), control proceeds from block 104 to block 106. If the trace 18 of the program is complete (block 106), the program of FIG. 8 terminates. Otherwise, if the trace 18 of the program is not complete (block 106), control returns to block 102 where the recording of the trace 18 continues.

If the trace processing thread has not already been invoked (block 104), control proceeds to block 108. At block 108, the trace processing thread is initiated. Control then proceeds to block 106. Control continues to loop through blocks 100–108 until the target program stops executing and the trace 18 is complete.

Once a trace processing thread is spawned (block 108, FIG. 8), the illustrated trace processing thread begins at block 120 (FIG. 14A) where the signature developer 16 obtains a set 26 of entries from the trace 18 created by the trace sampler 12. Once the entries to create a set 26 are retrieved from the trace 18 (block 120), the weight assigning engine 39 adjusts the values of the retrieved entries such that later entries are given greater weight than earlier entries (block 122). Once the values of the entries have been weighted by the weight assigning engine 34 (block 122), the signature developer 16 maps the entries in the set 26 to an n-bit vector to create a possible state signature 28 for the set 26 (block 124). After the possible state signature 28 is generated (block 124), the state distinguisher 38 determines whether the possible state signature 28 is the first possible state signature (block 126). If it is the first possible state signature (block 126), the first possible state signature is, by default, defined to be the first state signature. Thus, the state distinguisher 38 sets a current state signature variable equal to the possible state signature 28 (block 128) and creates a state data structure in the state array 44 for the first state (block 130). The signature developer 16 then collects the next set 26 of entries for creation of a possible state signature 28 (block 132). In the illustrated example, the sets 26 used by the signature developer 16 to create the possible signatures 28 are overlapping. Thus, the signature developer 16 may create the next set 26 of entries by dropping the oldest entr(ies) from the last set 26 of entries and adding a like number of new entr(ies) to create a new current set 26 (block 132). Control then returns to block 122 (FIG. 14A) where the entries in the new current set are weighted as explained above.

Figure 14A:
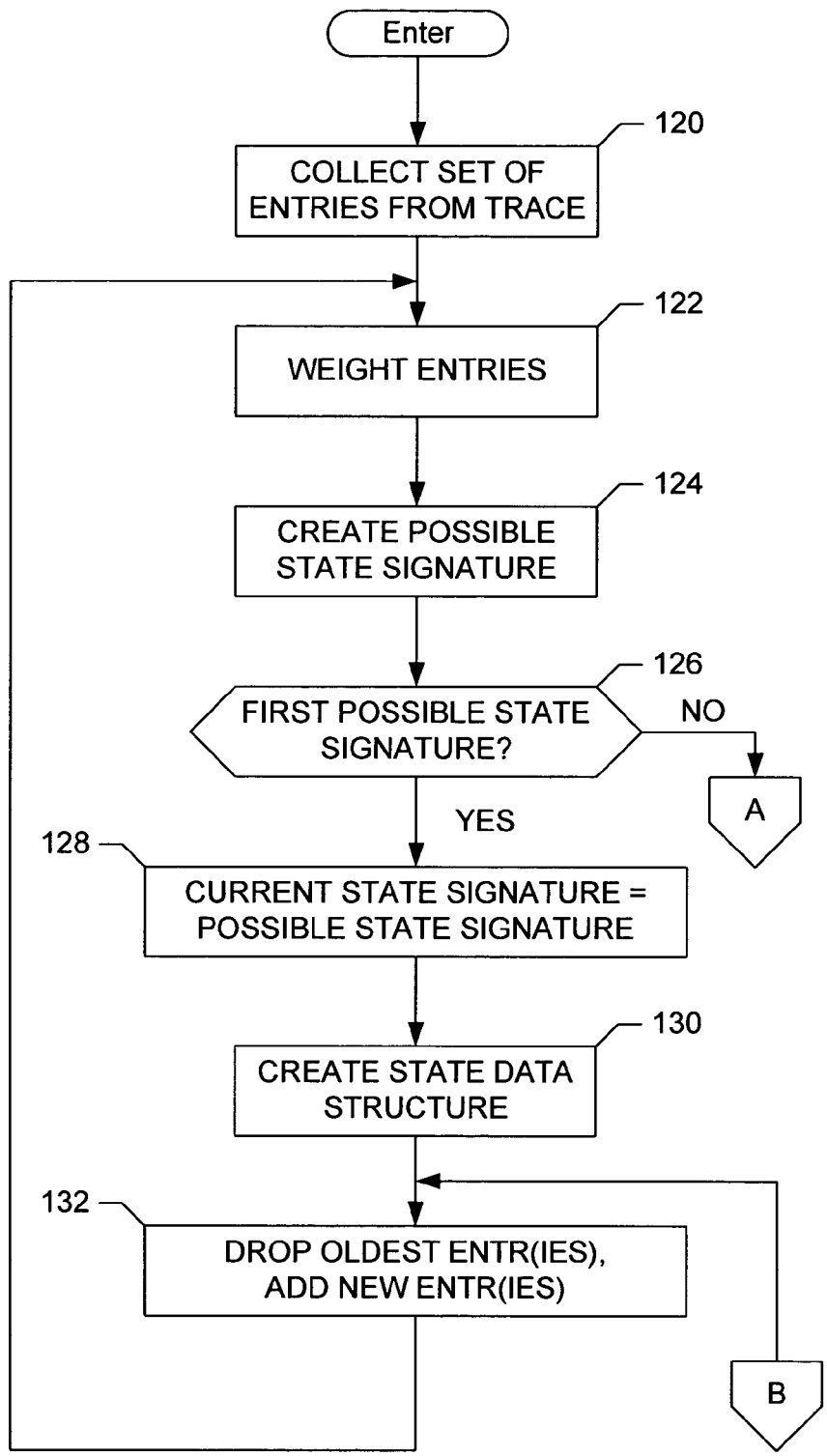
FIGS. 14A–14C are flowcharts illustrating example machine readable instructions for implementing the state identifier, the short-lived object identifier, the cache flusher, and the usage filter of the apparatus of FIG. 10.
Figure 14B:
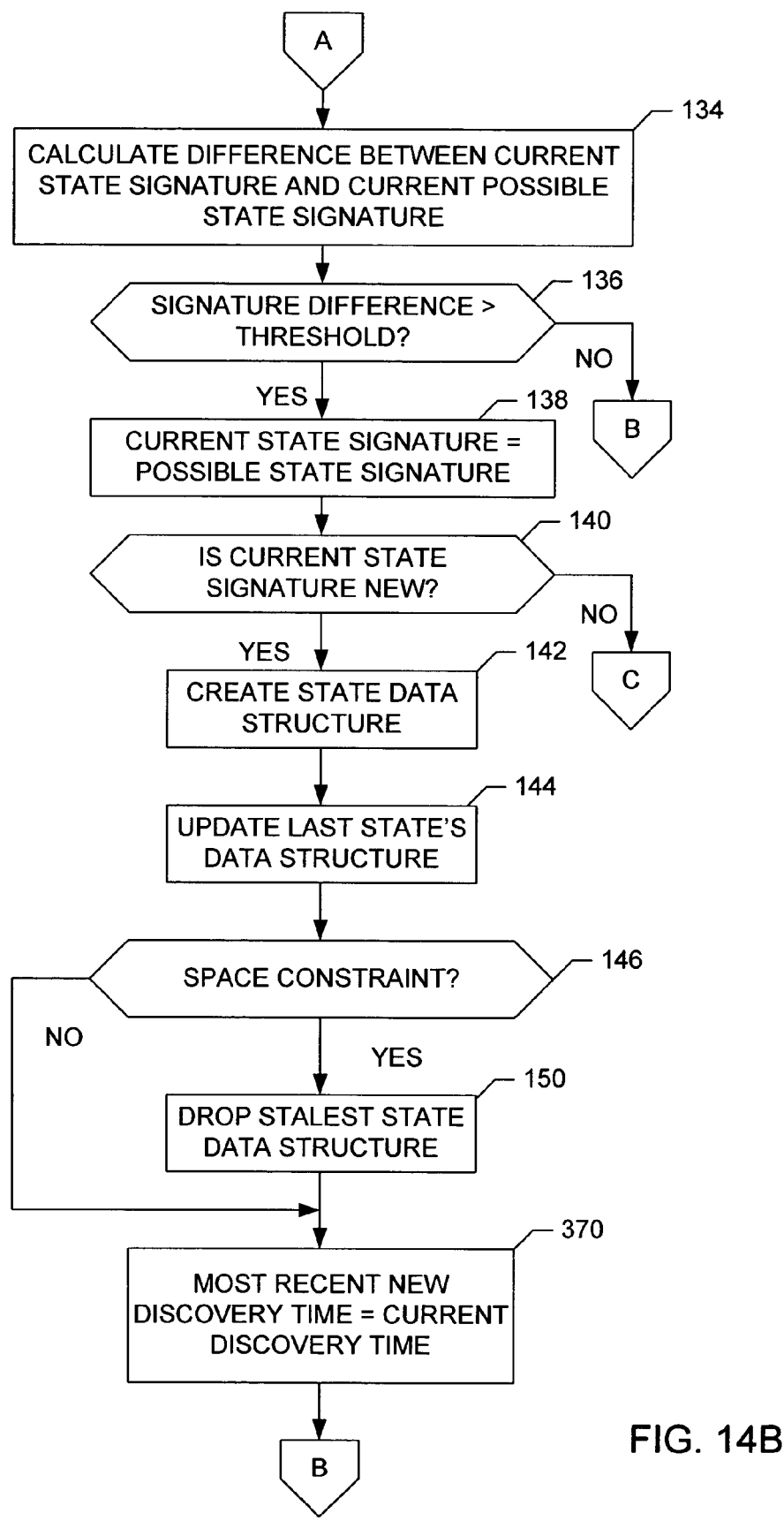

When at block 126 of FIG. 14A, the current possible state signature is not the first possible state signature, control will skip from block 126 to block 134 (FIG. 14B). At block 134, the state distinguisher 38 calculates the difference between the current state signature, and the current possible state signature. The state distinguisher 38 then compares the computed difference to a threshold. If the computed difference exceeds the threshold (block 136), a program state change has occurred and control proceeds to block 138. If the computed difference does not exceed the threshold (block 136), the signature developer 16 collects the next set 26 of entries for creation of a possible state signature 28 (block 132, FIG. 14A) and control returns to block 122 as explained above.

Figure 14C:
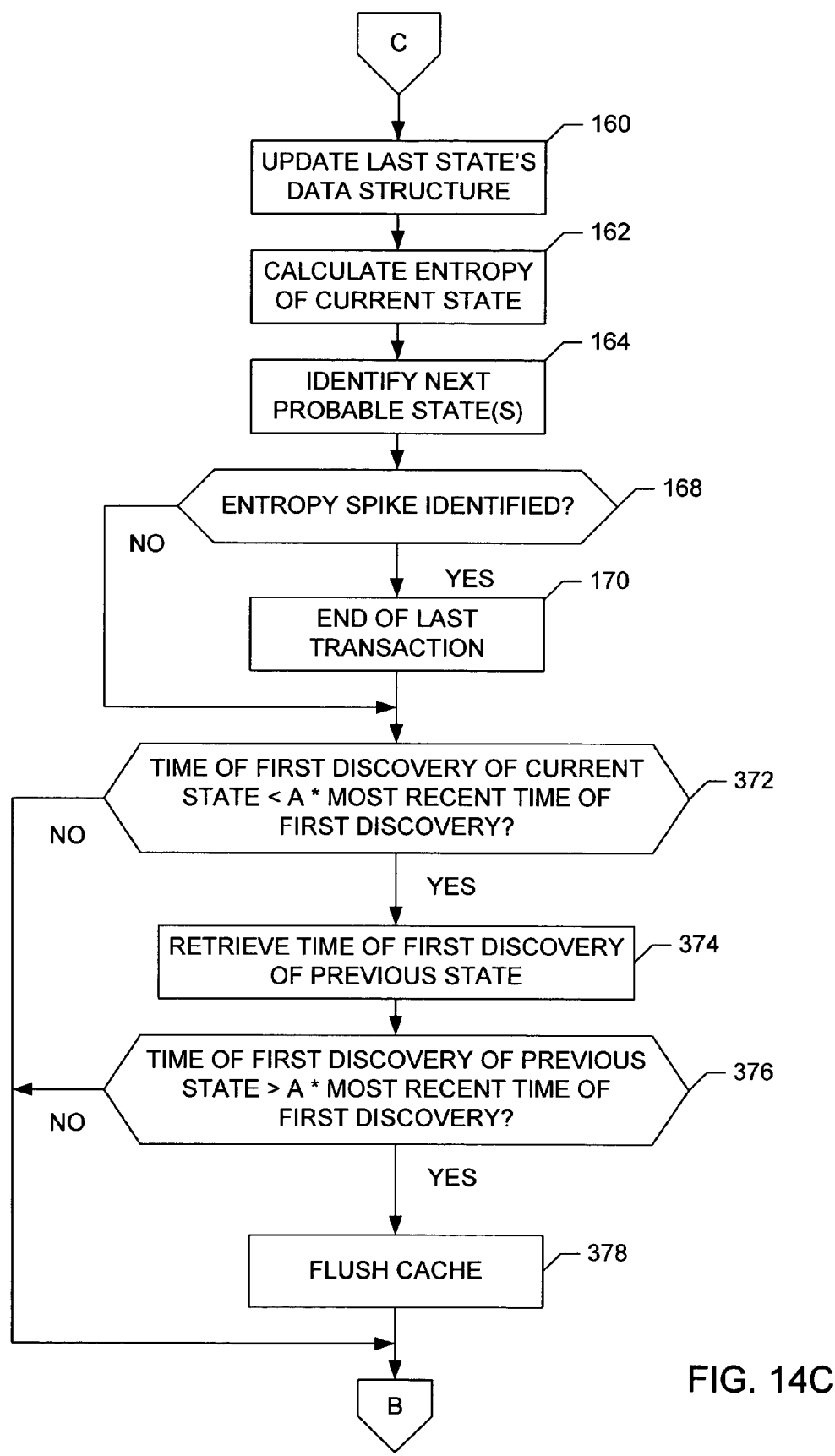

Assuming for purposes of discussion that a program state change has occurred (block 136 of FIG. 14B), the state distinguisher 38 sets the current state signature variable equal to the current possible state signature 28 (block 138). The state distinguisher 38 then examines the signatures present in the state array 44 to determine if the current state signature corresponds to the signature of a known state (block 140). If the current state signature is a known state signature, control advances to block 160 (FIG. 14C). Otherwise, if the current state signature is not a known state signature (i.e., the current state signature does not correspond to a state already existing in the state array 44), control advances to block 142 (FIG. 14B).

Assuming for purposes of discussion that the current state signature is not a known state signature (e.g., the current program state is a new program state) (block 140), the state distinguisher 38 creates a state data structure in the state array 44 for the first state (block 142) as explained above in connection with block 130.

The state transition monitor 48 then updates the last state's probability sub-array to reflect the transition from the last state to the new current state (block 144). Control then proceeds to block 146 where the state distinguisher 38 determines if the state array 44 has become full. If the state array 44 is not full (block 146), control advances to block 370 (FIG. 14B) where the short-lived object identifier 360 sets the Most Recent Time Of New Discovery variable to the time of first discovery of the newly identified state. In addition, the short-lived object identifier 360 records the memory references (or proxies for the memory references) in the corresponding state data structure to enable prefetching of the associated memory objects, if appropriate, at a later time. Control then returns to block 132 of FIG. 14A.

If the state array is full (block 146), control advances to block 150 (FIG. 14B) where the state distinguisher 38 deletes the stalest state data structure from the state array 44. Once the stalest state data structure is eliminated (block 150), control advances to block 370 (FIG. 14B) where the short-lived object identifier 360 sets the Most Recent Time Of New Discovery variable to the time of first discovery of the newly identified state and populates the new state data structure with the memory references as explained above. Control then returns to block 132 of FIG. 14A.

Assuming that the current state signature is a known state signature (block 140 of FIG. 14B), control proceeds to block 160 (FIG. 14C). The state transition monitor 48 then updates the last state's probability sub-array to reflect the transition from the last state to the new current state (block 160). Control then proceeds to block 162 where the entropy calculator 50 calculates the entropy value of the current state.

Once the entropy value is calculated (block 162), the event predictor 54 identifies the next most probable state(s) (block 164). The event predictor 54 may then examine the entropy values of the last few states to determine if an entropy spike has occurred (block 168). If an entropy spike is identified (block 168), the event predictor 54 identifies the program state corresponding to the entropy spike as the last state of a macroscopic transaction or sub-transaction (block 170). If an entropy spike is not identified (block 168), the end of a macroscopic transaction or sub-transaction has not occurred. Accordingly, control skips block 170 and proceeds to block 372 (FIG. 14C).

Irrespective of whether control reaches block 372 from block 170 or directly from block 168, at block 372 the short-lived object identifier 360 compares the time of first discovery of the current state (i.e., the present state of program execution) to the most recent time of first discovery (i.e., the value stored at block 370 of FIG. 14B in the most recent time of first discovery variable). If the time of first discovery of the current state is greater than the product of A (e.g., a factor such as 0.9) and the most recent time of first discovery, the current program state is associated with short-lived memory objects and control returns to block 132 of FIG. 14A.

If the time of first discovery of the current state is less than the product of A (e.g., a factor such as 0.9) and the most recent time of first discovery, the current program state is associated with long-lived memory objects and control advances to block 374 of FIG. 14C to determine whether a transition from a program state that is associated with short-lived memory objects to a program state that is associated with long-lived memory objects has begun.

At block 374, the short-lived object identifier 360 retrieves the time of first discovery of the program state immediately proceeding the current program state from the state data structure associated with the last program state. (The time of first discovery may be stored in the "age" field of each state data structure.) The short-lived object identifier 360 then determines whether a transition from a program state associated with short-lived objects to a program state associated with long-lived objects has begun by comparing the time of first discovery of the program state immediately preceding the current program state to the most recent time of first discovery. If the time of first discovery of the program state immediately preceding the current program state is less than the product of A (e.g., a factor such as 0.9) and the most recent time of first discovery, the program execution is not transitioning from a program state associated with short-lived memory objects to a program state associated with long-lived objects, and control returns to block 132 of FIG. 14A.

If the time of first discovery of the program state immediately preceding the current program state is greater than the product of A (e.g., a factor such as 0.9) and the most recent time of first discovery, the program execution is transitioning from a program state associated with short-lived memory objects to a program state associated with long-lived objects, and control advances to block 378 of FIG. 14C where the cache flusher 362 flushes the cache. Control then returns to block 132 of FIG. 14A.

Control continues to loop through blocks 122–378 until the entire trace 18 has been processed. Once the entire trace 18 has been processed, the trace processing thread of FIGS. 14A–14C terminates.

Figure 15:
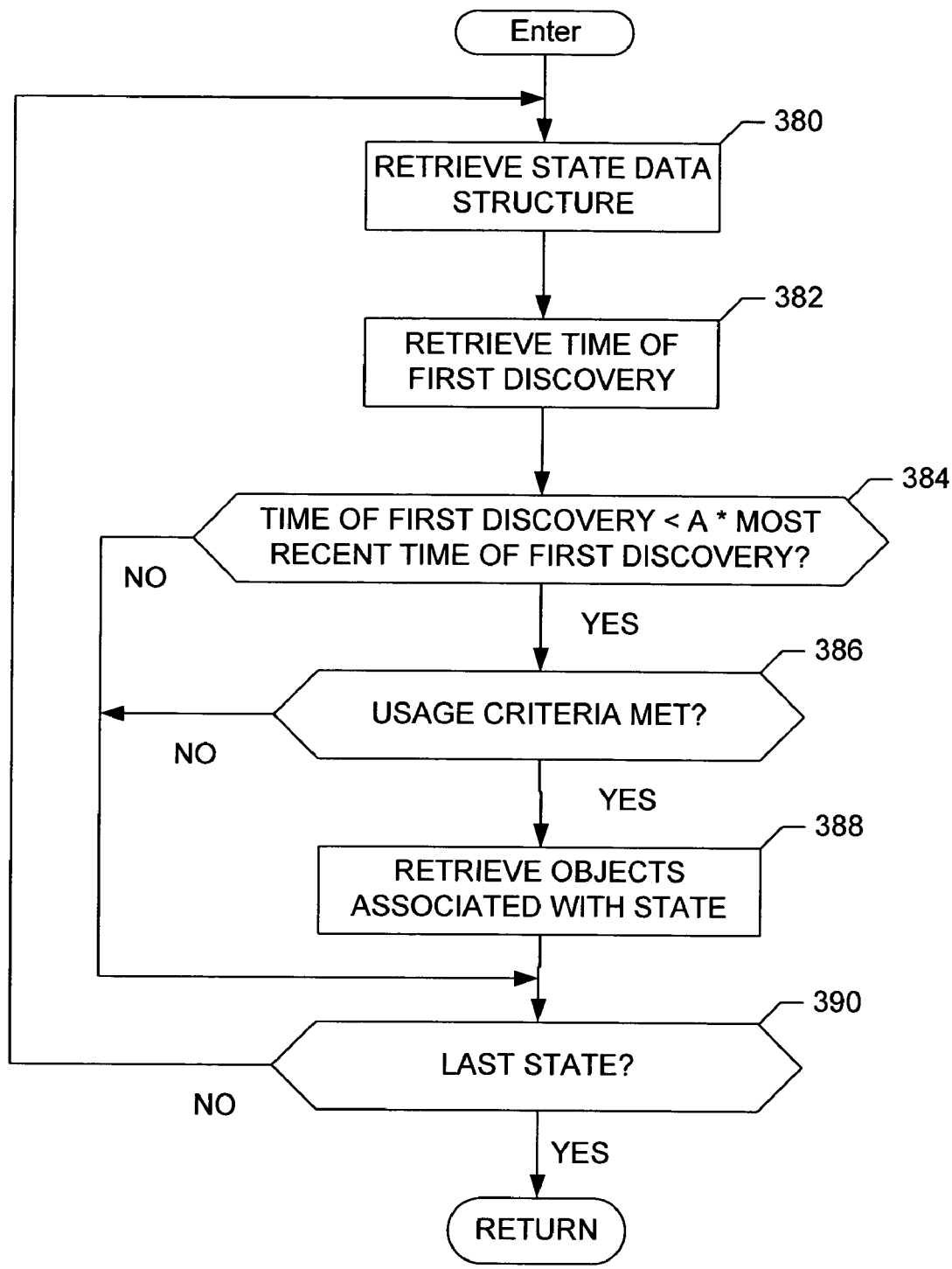
FIG. 15 is a flowchart illustrating example machine readable instructions for implementing an example cache flusher.

A flowchart representative of example machine readable instructions which may be executed to implement an example cache flusher 362 is shown in FIG. 15. The program of FIG. 15 may be a routine called at block 378 of FIG. 14C.

The program of FIG. 15 begins at block 380 where the cache flusher 362 retrieves the state data structure of a program state in the state array 44. The cache flusher 362 then retrieves the time of first discovery for the retrieved program state (block 382).

The cache flusher 362 then compares the retrieved time of first discovery to the most recent time of first discovery (block 384). If the time of first discovery of the retrieved program state is greater than the product of A (e.g., a factor such as 0.9) and the most recent time of first discovery (block 384), the program state retrieved from the state array 44 is not associated with long-lived memory objects and, thus, its associated memory objects should not be pre-fetched. Accordingly, control advances to block 390.

If the time of first discovery of the retrieved program state is less than the product of A (e.g., a factor such as 0.9) and the most recent time of first discovery (block 384), the program state retrieved from the state array 44 is associated with long-lived memory objects. Accordingly, the usage filter 364 is invoked to determine if the retrieved program state meets one or more usage criteria (block 386). If the usage criteria are not met (block 386), control advances to block 390. If the usage criteria are met (block 386), control advances to block 388 where the memory objects associated with the memory references stored in the data structure of the retrieved program state are pre-fetched. Control then advances to block 390.

Irrespective of whether control reaches block 390 via block 388 or directly from block 386, at block 390, the cache flusher 362 determines whether it has considered every state in the state array for possible pre-fetching. If not, control returns to block 380 where the next state is retrieved from the state array 44. Otherwise, the cache flushing routine terminates and control returns to block 132 of FIG. 14A. Control continues to loop through blocks 380–390 until all of the states in the state array 44 have been examined by the cache flusher to determine if pre-fetching is appropriate.

Figure 16:
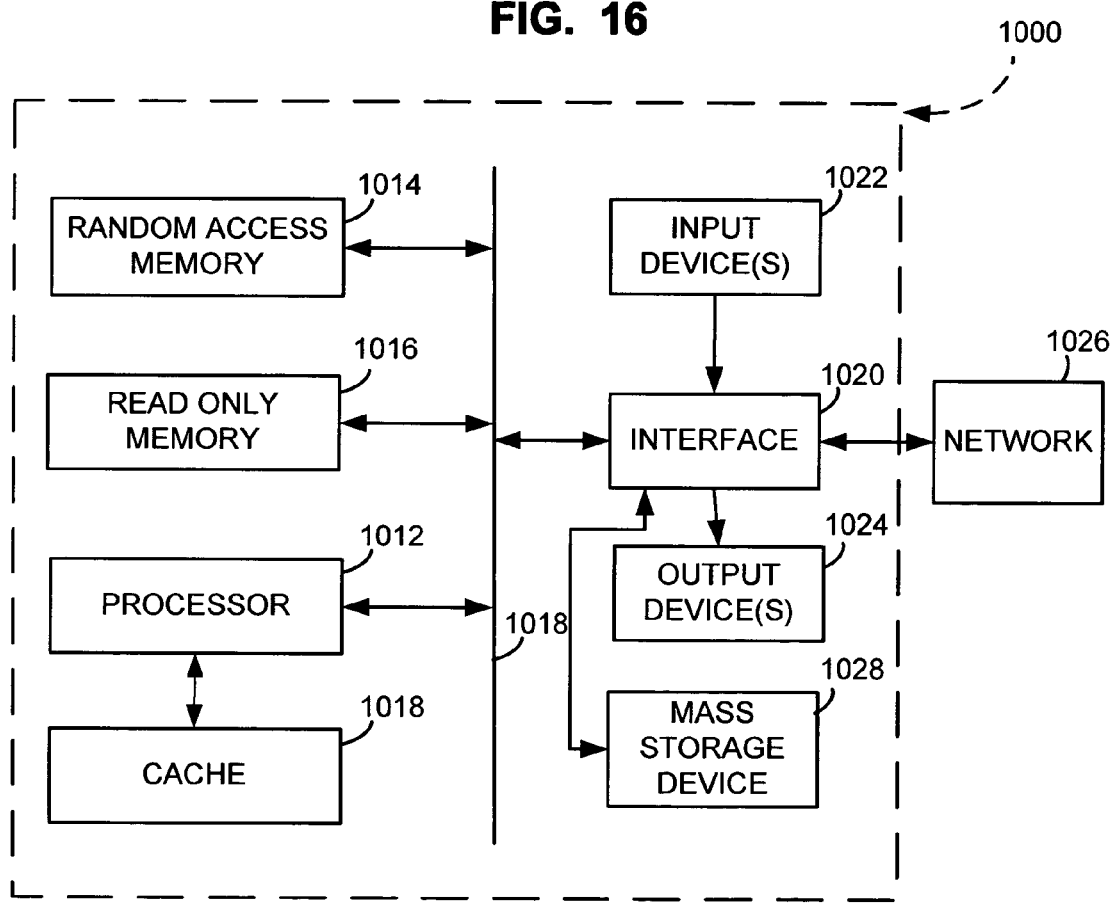
FIG. 16 is a schematic illustration of an example computer which may execute the programs of FIGS. 8 and 9A–9C to implement the apparatus of FIG. 1 and/or which may execute the programs of FIGS. 8, 14A–14C and 15 to implement the apparatus of FIG. 10.

FIG. 16 is a block diagram of an example computer 1000 capable of implementing the apparatus and methods disclosed herein. The computer 1000 can be, for example, a server, a personal computer, a personal digital assistant (PDA), an Internet appliance, a DVD player, a CD player, a digital video recorder, a personal video recorder, a set top box, or any other type of computing device.

The system 1000 of the instant example includes a processor 1012. For example, the processor 1012 can be implemented by one or more Intel® microprocessors from the Pentium® family, the Itanium® family, the XScale® family, or the Centrino™ family. Of course, other processors from other families are also appropriate.

The processor 1012 is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is typically controlled by a memory controller (not shown) in a conventional manner.

The processor 1012 is also in communication with a cache memory 1018. The cache memory 1018 is typically much smaller than the main memory. The cache 1018 may be integrated on the same chip with the processor 1012 (i.e., on-chip cache), and/or may be a separate integrated circuit from the processor 1012 (i.e., off-chip cache). The cache 1018 may be implemented by, for example, SDRAM.

The computer 1000 also includes a conventional interface circuit 1020. The interface circuit 1020 may be implemented by any type of well known interface standard, such as an Ethernet interface, a universal serial bus (USB), and/or a third generation input/output (3GIO) interface.

One or more input devices 1022 are connected to the interface circuit 1020. The input device(s) 1022 permit a user to enter data and commands into the processor 1012. The input device(s) can be implemented by, for example, a keyboard, a mouse, a touch screen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the memory 44.

As an alternative to implementing the methods and/or apparatus described herein in a system such as the device of FIG. 16, the methods and/or apparatus described herein may alternatively be embedded in a structure such as processor and/or an ASIC (application specific integrated circuit).

From the foregoing, persons of ordinary skill in the art will appreciate that the above disclosed methods and apparatus may be implemented in a static compiler, a managed run-time environment just-in-time compiler (JIT), and/or directly in the hardware of a microprocessor to achieve performance optimization in executing various programs and/or to reduce cache misses.

Although certain example methods, apparatus, and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A method of managing a cache comprising:
   identifying program states associated with an executing program;
   comparing a time of first discovery of a program state to a most recent time of first discovery to determine if the program state is associated with short-lived objects; and
   if the program state is not associated with short-lived objects and program execution has transitioned to the program state from a program state associated with short-lived objects, flushing the cache of at least one short-lived object.

2. A method as defined in claim 1 wherein identifying the program states associated with the executing program comprises:
   developing a trace of the program; and
   identifying the program states from the trace by comparing sets of data at least partially indicative of addresses associated with the trace.

3. A method as defined in claim 2 wherein the sets of data are intersecting sets of data.

4. A method as defined in claim 2 wherein the addresses are memory addresses.

5. A method as defined in claim 1 wherein the most recent time of first discovery is associated with a most recently discovered program state.

6. A method as defined in claim 1 wherein comparing the time of first discovery of the program state to the most recent time of first discovery comprises comparing the time of first discovery of the program state to a percentage of the most recent time of first discovery.

7. A method as defined in claim 1 wherein the program state is a first program state and further comprising comparing a time of first discovery of a previous program state proceeding the first program state to the most recent time of first discovery to determine if program execution has transitioned from a program state associated with short-lived objects to a program state associated with long-lived objects.

8. A method as defined in claim 7 wherein there is no program state between the first program state and the previous program state.

9. A method as defined in claim 7 wherein comparing the time of first discovery of the previous program state to the most recent time of first discovery comprises comparing the time of first discovery of the previous program state to a percentage of the most recent time of first discovery.

10. A method as defined in claim 1 wherein flushing the cache comprises releasing at least a portion of the cache associated with the at least one short-lived object for overwriting.

11. A method as defined in claim 1 wherein flushing the cache comprises pre-fetching data associated with program states having a time of first discovery less than a predetermined percentage of the most recent time of first discovery.

12. A method as defined in claim 1 wherein flushing the cache comprises pre-fetching data associated with program states (a) having a time of first discovery less than a predetermined percentage of the most recent time of first discovery and (b) meeting a usage criterion.

13. An article of manufacture storing machine readable instructions which, when executed, cause a machine to:
    identify program states associated with an executing program;
    compare a time of first discovery of a program state to a most recent time of first discovery to determine if the program state is associated with short-lived objects in a cache; and
    to flush the cache of at least one short-lived object if the program state is not associated with short-lived objects and program execution has transitioned to the program state from a program state associated with short-lived objects.

14. An article of manufacture as defined in claim 13 wherein the most recent time of first discovery is associated with a most recently discovered program state.

15. An article of manufacture as defined in claim 13 wherein the instructions cause the machine to compare the time of first discovery of the program state to the most recent time of first discovery by comparing the time of first discovery of the program state to a percentage of the most recent time of first discovery.

16. An article of manufacture as defined in claim 15 wherein the instructions further cause the machine to compare a time of first discovery of a previous program state proceeding the program state to the most recent time of first discovery to determine if program execution has transitioned from a program state associated with short-lived objects to a program state associated with long-lived objects.

17. An article of manufacture as defined in claim 15 wherein the instructions further cause the machine to compare a time of first discovery of a previous program state proceeding the program state to a percentage of the most recent time of first discovery to determine if program execution has transitioned from a program state associated with short-lived objects to a program state associated with long-lived objects.

18. An apparatus to manage a cache comprising:
    a trace sampler to develop a trace of a program;
    a state identifier to identify program states from the trace; and
    a short-lived object identifier to identify program states associated with short-lived objects based on the times of first discovery of the program states.

19. An apparatus as defined in claim 18 further comprising a cache flusher to remove a short-lived object from the cache when the executing program transitions from a program state associated with the short-lived object to a program state associated with a long-lived object.

20. An apparatus as defined in claim 19 wherein the cache flusher removes the short-lived object by releasing a memory location where the short-lived object is stored for overwriting.

21. An apparatus as defined in claim 19 wherein the cache flusher removes the short-lived object by pre-fetching an object associated with a program state having a first discovery time less than a predetermined percentage of the most recent discovery time.

22. An apparatus as defined in claim 21 further comprising a usage filter to limit the objects pre-fetched by the cache flusher to program states meeting a usage criterion.

23. An apparatus as defined in claim 18 wherein the trace comprises a memory address trace.

24. An apparatus as defined in claim 18 wherein the state identifier further comprises:
    a signature developer to develop possible state signatures for sets of entries in the trace; and
    a state distinguisher to identify program states based on the possible state signatures.

25. An apparatus as defined in claim 24 wherein the signature developer develops a first possible state signature by mapping a first set of entries in the trace to a first bit vector signature.

26. An apparatus as defined in claim 25 wherein the signature developer develops a second possible state signature from a second set of entries in the trace by mapping the second set of entries to a second bit vector signature.

27. An apparatus as defined in claim 26 wherein the first set of entries partially intersects the second set of entries.

28. An apparatus as defined in claim 18 wherein at least one of the state identifier and an entropy calculator indexes the program states by their respective times of first discovery.

29. An apparatus as defined in claim 18 wherein the short-lived object identifier identifies a program state as being associated with a short-lived object by comparing a time of first discovery of the program state to a most recent time of first discovery.

30. An apparatus as defined in claim 29 wherein a cache flusher removes the short lived object from the cache if the program state is associated with the short-lived object and a time of first discovery of a following program state is less than a threshold.

31. An apparatus as defined in claim 18 wherein the short-lived object identifier identifies the program state as being associated with a short-lived object if the time of first discovery of the program state is greater than a predetermined percentage of the most recent time of first discovery.

32. An apparatus as defined in claim 31 wherein a cache flusher removes the short lived object from the cache if the program state is associated with the short-lived object and the time of first discovery of a following program state is less than the predetermined percentage of the most recent time of first discovery.

33. A method of managing a cache comprising:
   identifying program states associated with an executing program; and
   if an age of a current program state is less than a first threshold and an age of a previous program state is greater than a second threshold, pre-fetching memory objects associated with program states having an age less than a third threshold.

34. A method as defined in claim 33 wherein identifying the program states associated with the executing program comprises:
   developing a trace of the program; and
   identifying the program states from the trace by comparing sets of data at least partially indicative of addresses associated with the trace.

35. A method as defined in claim 33 wherein the first threshold comprises a percentage of first discovery time of a most recently discovered program state.

36. A method as defined in claim 35 wherein the second threshold and the first threshold are substantially identical.

37. A method as defined in claim 33 wherein there is no program state between the current program state and the previous program state.

38. A method as defined in claim 33 wherein the first, second and third thresholds are substantially identical.

39. A method of managing a cache comprising:
   identifying program states associated with an executing program; and
   if a first discovery time of a current program state is less than a first threshold and a first discovery time of a previous program state is greater than a second threshold, pre-fetching memory objects associated with program states having a first discovery time less than a third threshold.

40. A method as defined in claim 39 wherein identifying the program states associated with the executing program comprises:
   developing a trace of the program; and
   identifying the program states from the trace by comparing intersecting sets of data at least partially indicative of addresses associated with the trace.

41. A method as defined in claim 39 wherein the first threshold comprises a percentage of a first discovery time of a most recently discovered program state.

42. A method as defined in claim 41 wherein the second threshold and the first threshold are substantially identical.

43. A method as defined in claim 39 wherein there is no program state between the current program state and the previous program state.

44. A method as defined in claim 39 wherein the first, second and third thresholds are substantially identical.

45. An apparatus comprising:
   an off-chip cache;
   a trace sampler to develop a trace of a program;
   a state identifier to identify program states from the trace; and
   a short-lived object identifier to identify program states associated with short-lived objects based on the times of first discovery of the program states.

46. An apparatus as defined in claim 45 further comprising a cache flusher to remove a short-lived object from the off-chip cache when the executing program transitions from a program state associated with the short-lived object to a program state associated with a long-lived object.

* * * * *